(12) United States Patent
Nagano

(10) Patent No.: US 10,330,834 B2
(45) Date of Patent: Jun. 25, 2019

(54) DISPLAY AND ARTICLE WITH LABEL

(71) Applicant: Toppan Printing Co., Ltd., Taito-ku, Tokyo (JP)

(72) Inventor: Akira Nagano, Taito-ku (JP)

(73) Assignee: TOPPAN PRINTING CO., LTD., Tokyo (JP)

(*) Notice: Subject to any disclaimer, the term of this patent is extended or adjusted under 35 U.S.C. 154(b) by 574 days.

(21) Appl. No.: 14/832,511

(22) Filed: Aug. 21, 2015

(65) Prior Publication Data

US 2015/0362642 A1 Dec. 17, 2015

Related U.S. Application Data

(63) Continuation of application No. PCT/JP2014/000938, filed on Feb. 21, 2014.

(30) Foreign Application Priority Data

Feb. 21, 2013 (JP) .................................. 2013-032205
Sep. 9, 2013 (JP) .................................. 2013-186245

(51) Int. Cl.
*G02B 5/18* (2006.01)
*G07D 7/00* (2016.01)
(Continued)

(52) U.S. Cl.
CPC ........... *G02B 5/1866* (2013.01); *B42D 25/30* (2014.10); *G02B 5/02* (2013.01); *G02B 5/0278* (2013.01);
(Continued)

(58) Field of Classification Search
CPC .. G02B 5/1866; G02B 5/1814; G02B 5/0808; G02B 5/0278; G02B 5/1842;
(Continued)

(56) References Cited

U.S. PATENT DOCUMENTS

| 5,058,992 A | 10/1991 | Takahashi | |
| 2008/0136160 A1* | 6/2008 | Leenders | B41M 5/0029 283/72 |
| 2010/0307705 A1* | 12/2010 | Rahm | B42D 25/29 162/140 |

FOREIGN PATENT DOCUMENTS

| JP | 2008-107469 A | 5/2008 |
| JP | 2008-107472 A | 5/2008 |

(Continued)

OTHER PUBLICATIONS

Office Action dated Mar. 10, 2017 issued in Japanese Patent Application No. 2015-501345.
(Continued)

*Primary Examiner* — Justin V Lewis
(74) *Attorney, Agent, or Firm* — Foley & Lardner LLP

(57) ABSTRACT

The present invention provides a display exhibiting high anti-counterfeiting effects and special visual effects. The display of the present invention includes a relief structure-forming layer having a plurality of relief structure-forming areas that are provided on one principal surface side of a light transmissive base, a light reflection layer covering at least a part of the relief structure-forming layer, and a light scattering layer provided on a light reflection layer side of the relief structure-forming layer. The plurality of relief structure-forming areas have a plurality of convexities or a plurality of concavities having a first surface substantially parallel to the principal surface and a second surface substantially parallel to the first surface. In each of the plurality of relief structure-forming areas, a difference in height between the first and second surfaces is substantially constant, and at least one of a difference in height between the first and second surfaces and a height of a virtual plane configured by the first surface is different from the difference in height or a height of the virtual plane of other relief
(Continued)

structure-forming areas. The plurality of relief structure-forming areas are arranged in accord with a color image to be displayed.

8 Claims, 17 Drawing Sheets

(51) Int. Cl.
    *G02B 5/08*     (2006.01)
    *G02B 5/02*     (2006.01)
    *B42D 25/30*     (2014.01)

(52) U.S. Cl.
    CPC ............ *G02B 5/08* (2013.01); *G02B 5/0808* (2013.01); *G02B 5/18* (2013.01); *G02B 5/1814* (2013.01); *G02B 5/1842* (2013.01); *G02B 5/1861* (2013.01); *G07D 7/003* (2017.05)

(58) Field of Classification Search
    CPC .......... G02B 5/1861; G02B 5/08; G02B 5/18; G02B 5/02; G07D 7/003; B42D 25/30
    USPC ........................................ 283/72, 91, 94, 98
    See application file for complete search history.

(56) References Cited

FOREIGN PATENT DOCUMENTS

| JP | 2008-275740 A | 11/2008 |
| JP | 2010-044267 A | 2/2010 |
| JP | 2011-027832 A | 2/2011 |
| JP | 04-983899 B2 | 7/2012 |
| JP | 2013-193268 A | 9/2013 |

OTHER PUBLICATIONS

International Search Report dated Apr. 8, 2014 issued in Application No. PCT/JP2014/000938.

* cited by examiner

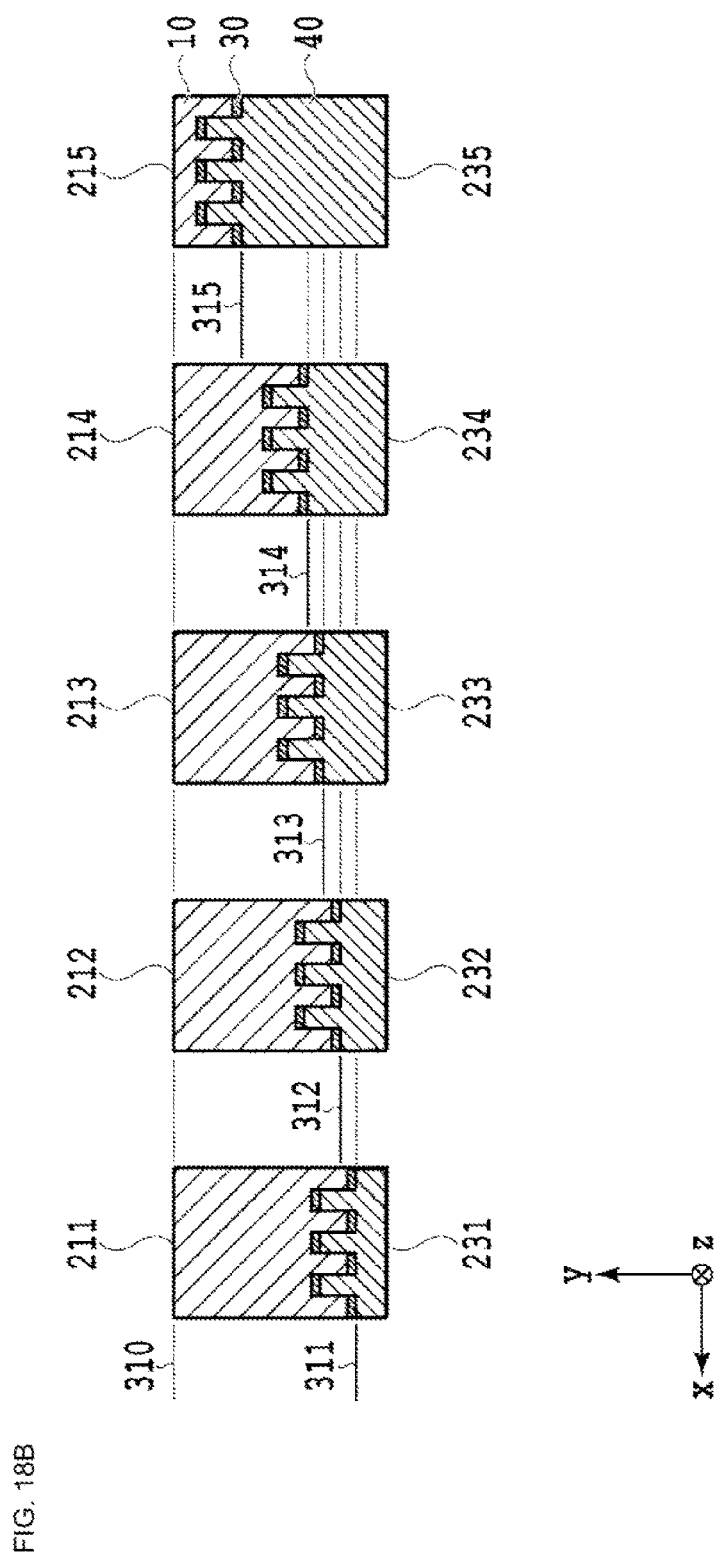

DISPLAY AND ARTICLE WITH LABEL

CROSS-REFERENCE TO RELATED PATENT APPLICATIONS

This application is an application filed under 35 U.S.C. 111(a) claiming the benefit under 35 U.S.C. §§ 120 and 365(c) of PCT International Application No. PCT/JP2014/000938 filed on Feb. 21, 2014, which is based upon and claims the benefit of priority of Japanese Application No. 2013-032205 filed on Feb. 21, 2013 and of Japanese Application No. 2013-186245 filed on Sep. 9, 2013, the entire contents of them all are hereby incorporated by reference.

BACKGROUND

The present invention relates to a display technique that contributes to exerting anti-counterfeiting effects.

Generally, valuable stock certificates, such as gift tickets or checks, cards, such as credit cards, cash cards or ID cards, and certificates, such as passports or driver's licenses, are each adhered with a display having visual effects different from those of a normal printed object, for the purpose of preventing counterfeiting of these articles. Further, recently, circulation of counterfeit articles besides these articles is also becoming a social problem. Therefore, there are increasing opportunities of applying similar anti-counterfeiting technique to such articles as well.

As described in the specification of U.S. Pat. No. 5,058,992, a display exerting visual effects different from those of a normal printed object uses a method of arranging a plurality of relief-type diffraction gratings having grooves whose longitudinal directions or grating constants (i.e. pitches of grooves) are different from each other, and displaying an iridescently changing image. However, lots of articles needing measures for preventing counterfeit have used such a display that includes relief-type diffraction gratings. As a result, this technique is now widely known. Along with this, there is a tendency that counterfeit articles that have incorporated this technique are increasingly common. Therefore, it is now more difficult to achieve sufficient anti-counterfeiting effects using a display only characterized by iridescent light that is due to diffracted light.

In order to achieve more sufficient anti-counterfeiting effects, JP-B-4983899 discloses a display that realizes special visual effects which are different from those of conventional relief-type diffraction grating. JP-B-4983899 discloses a display provided with a concavo-convex structure which is configured by arranging a plurality of convexities having an upper surface that is substantially parallel to a base surface or a plurality of concavities having a bottom surface that is substantially parallel to the base surface, and a smooth portion that is substantially parallel to the base surface. This display has a function of displaying a mixed color which is configured by light of a plurality of wavelengths, in a predetermined direction. The image shown by the display hardly exhibits color change in an iridescent manner in accord with the change of position of an illumination source or the position of an observer, but realizes visual effects that are different from those of the conventional relief-type diffraction grating aimed to anti-counterfeit. As a result, a display exerting high eye-catching effects (effects of attracting people's attention) and high anti-counterfeiting effects can be realized.

However, the display disclosed in JP-B-4983899 displays only a mixed color that is configured by light of a plurality of wavelengths which are obtained from the concavo-convex structure configured by convexities or concavities substantially parallel to the base surface and a smooth portion substantially parallel to the base surface. Therefore, when the display is observed from the back side as well, a color that is the same as the one observed from the front side of the display is observed. The configuration shown in JP-B-4983899 is not able to achieve the visual effects that are different on the front and back and desirable for obtaining higher anti-counterfeiting effects.

SUMMARY OF THE INVENTION

The present invention has been made in light of the circumstances set forth above and has as its object to provide a display that exerts improved anti-counterfeiting effects and special visual effects, and an article with a label.

A first invention is a display including a relief structure-forming layer having a plurality of relief structure-forming areas that are provided on one principal surface side of a light transmissive base; a light reflection layer covering at least a part of the relief structure-forming layer; and a light scattering layer provided by the side of the light reflection layer of the relief structure-forming layer, being imparted with light transmission performance, while being imparted with light scattering performance in at least a part thereof, characterized in that: the plurality of relief structure-forming areas have a plurality of convexities or a plurality of concavities having a first surface substantially parallel to the principal surface and a second surface substantially parallel to the first surface; the light reflection layer is formed in conformity with a shape of the plurality of convexities or concavities; in each of the plurality of relief structure-forming areas, a difference in height between the first surface and the second surface is substantially constant; in each of the plurality of relief structure-forming areas, at least one of a difference in height between the first surface and the second surface and a height of a virtual plane configured by the first surface is different from the difference in height or a height of the virtual plane of other relief structure-forming areas; and the plurality of relief structure-forming areas are arranged in accord with a color image to be displayed.

Further, a second invention according to the first invention is the display characterized in that, in each of the plurality of relief structure-forming areas, a height of a virtual plane configured by the first surface is different from a height of the virtual plane in other relief structure-forming areas.

Further, a third invention according to the second invention is the display characterized in that the light scattering layer includes a plurality of light scattering areas having different thicknesses and corresponding to the relief structure-forming areas.

Further, a fourth invention according to any of the first to third inventions is the display characterized in that the display further includes a printed layer in color.

Further, a fifth invention according to any of the first to fourth inventions is the display characterized in that the light scattering layer contains spherical microparticles having light scattering performance.

Further, a sixth invention according to any of the first to fifth inventions is the display characterized in that the light scattering layer is an adhesive layer.

Further, a seventh invention according to any of the first to sixth inventions is the display characterized in that the light scattering layer has light scattering performance which is substantially uniform in a unit volume.

Further, an eighth invention according to any of the first to seventh inventions is the display characterized in that the light scattering layer has a haze value of not less than 80% and a total light transmittance of not less than 30%.

Further, a ninth invention is an article with a display, characterized in that the article with a label includes a display according to any of first to eighth inventions, and an article carrying the display.

With the configuration of the present invention, the display includes a relief structure-forming layer having a plurality of relief structure-forming areas. The plurality of relief structure-forming areas have a plurality of convexities or a plurality of concavities having a first surface substantially parallel to a display surface and a second surface substantially parallel to the first surface. In each of the plurality of relief structure-forming areas, a difference in height between the first surface and the second surface is substantially constant, and in each of the plurality of relief structure-forming areas, at least either one of a difference in height between the first surface and the second surface and a height of a virtual plane configured by the first surface is different from the difference in height or a height of the virtual plane of other relief structure-forming areas.

When white illumination is incident on such a structure, a difference is caused in an optical path length (sum of products of a geometric distance and a refractive index) between the light reflected by the first surface and the light reflected by the second surface. Accordingly, the light corresponding to the difference in the optical path length causes interference to mutually weaken light of a specific wavelength. Thus, the emission light emitted from the relief structure-forming layer is not white in color but becomes light that is able to display any hue, with a chromatic color created by the specific wavelength which is determined by the difference in height between the first and second surfaces.

The light reflection layer formed in conformity with the shape of the convexities or the concavities of the relief structure-forming layer contributes to more strongly reflecting the incident light to enable clearer display of any hue created by the specific wavelength.

The emission light from the above display hardly changes in an iridescent manner in accord with the change in the position of the illumination and the position of an observer, thereby enabling display in the same color in a wide observation range.

The display further includes the light scattering layer. When the display is observed from one surface side on which the light scattering layer is provided, the emission light is scattered together with specular reflection components of the incident light, disabling display of any hue with a chromatic color. When observed from the one surface side on which the light scattering layer is provided, the light that reaches the observer from the display (emission light emitted via the light scattering layer) changes in accord with the light scattering performance of the light scattering layer. Sufficiently high light scattering performance of the light scattering layer can achieve scattered light in a white color that relies on the wavelength components of white illumination. On the other hand, low light scattering performance of the light scattering layer can achieve scattered light that displays a pastel color whose hue of a chromatic color is retained to some extent.

As a result, when the display is observed from a side not provided with the light scattering layer, one can observe display of any hue (color display) created by the specific wavelength. On the other hand, when the display is observed from the side provided with the light scattering layer, one can observe a display of a pastel color created by adding white illumination components to the color display, or a display created by white scattered light (monochromatic display).

Each relief structure-forming area is configured by a plurality of convexities or a plurality of concavities having the first surface substantially parallel to a principal surface of the base and the second surface substantially parallel to the first surface. In each relief structure-forming area, a plane configured by the first surface of the plurality of convexities or concavities is defined to be a virtual plane. In each of the plurality of relief structure-forming areas of the display of the present embodiment, a height of the virtual plane relative to the base surface may be different from the height in other relief structure-forming areas. When the light scattering layer is formed on the light reflection layer side in this configuration, the light scattering layer has a surface on the relief structure forming-layer side, which is in conformity with the plurality of convexities or concavities of the relief structure-forming layer, and the light scattering layer has a surface opposite to the relief structure-forming layer, which is substantially smooth. Accordingly, the thickness of the light scattering layer is varied in accord with the height of the virtual plane relative to the base surface. The light scattering performance can be controlled by varying the thickness of the light scattering layer. In other words, an area with a relatively small thickness allows the light scattering performance to be lower, while an area with a relatively large thickness allows the light scattering performance to be enhanced. When observing the display from one side that is provided with the light scattering layer, the difference in the light scattering performance enables the observer to selectively perceive an area where display of any hue created by the relief structure-forming layer can be observed, and an area where a monochromatic display created by the scattered light in white color can be observed.

The present display achieves high anti-counterfeiting effects owing to such special visual effects that enable display of different hues on the front and back.

Further, the relief structure-forming layer is provided with the plurality of relief structure-forming areas having different differences in height between the first and second surfaces. Thus, light of a different color is emitted from each relief structure-forming area. Accordingly, the front side can perform color display with a plurality of colors, while the back side can also perform multicolor display of a different hue (pastel display and monochromatic display). Further, devising the relief structure-forming layer, recognition of a pattern may be disabled on the front side but enabled on the back side.

Further, the display may further include a printed layer in color. In respect of a display based on the relief structure-forming layer, the hue is permitted to change via the light scattering layer. Particularly, a display obtained via the light scattering layer is monochromatic in an area where the light scattering performance is sufficient. However, in respect of the printed layer, a color display of the same hue is obtained via the light scattering layer. Accordingly, the front side can provide a display of the same color (color display), while the back side can provide a display of a different color.

Further, the light scattering layer may include spherical microparticles having light scattering performance. The inclusion of the spherical microparticles in the light scattering layer can achieve high light scattering performance, can sufficiently scatter the light of the specific wavelength emitted from the relief structure-forming layer, and can turn the light into white color emission light. By controlling the particle size and the filling quantity of the spherical microparticles, the light scattering performance and the light transmission performance can also be adjusted as desired.

Further, the light scattering layer may be an adhesive layer. The light scattering layer as an adhesive layer can allow the display to be stuck onto an article which is in need of an anti-counterfeiting function. Furthermore, by permitting the light scattering layer to also serve as an adhesive layer, the necessity of separately providing a light scattering layer is eliminated to thereby reduce the thickness of the display as a whole.

Further, the light scattering layer may have light scattering performance which is substantially uniform in a unit volume. The substantially uniform light scattering performance of the light scattering layer enables accurate control of the light scattering performance in accord with the thickness of the light scattering layer.

Further, each relief structure-forming area can display visually recognizable information as an image, using the change in the light scattering performance conforming to the thickness of the light scattering layer that covers the area. In the present display, multistep change in the height of the virtual plane relative to the base surface can achieve a pastel display through the interaction of the light scattering performance with an optional hue. Also, an image can be displayed using light and shade of the pastel display. This image, when observed from the light scattering layer side, is achieved by the difference in height between the virtual plane and the base surface. On the other hand, when the present display is observed from the relief structure-forming layer side, no difference is caused in the display color due to the difference in the height. Accordingly, this enables display of different hues on the front and back and/or different images on the front and back. The anti-counterfeiting effects can be further enhanced by the use of a painted pattern, a logotype, or a mark as the light-and-shade image mentioned above.

Further, the light scattering layer may have a haze value of not less than 80% and a total light transmittance of not less than 30%. When the haze value of the light scattering layer is not less than 80% but not more than 100%, the light of the specific wavelength emitted from the relief structure-forming layer can be sufficiently scattered to thereby turn the emission light into white scattered light. Further, when the total light transmittance of the light scattering layer is not less than 30% but not more than 100%, the light emitted from the relief structure-forming layer is prevented from being blocked more than necessary. Thus, an observer is able to perceive light that is a mixture of the light for displaying a chromatic color created by the relief structure-forming layer with the specular reflection.

BRIEF DESCRIPTION OF THE DRAWINGS

FIG. 18B is a cross-sectional view illustrating the relief structure-forming areas according to the second embodiment of the present invention;

DETAILED DESCRIPTION OF REPRESENTATIVE EMBODIMENTS

With reference to the drawings, hereinafter are specifically described some embodiments of the present invention. It should be noted that, throughout the drawings, components identical with or analogous to each other are given the same reference signs for the sake of omitting similar descriptions.

Figure 1:
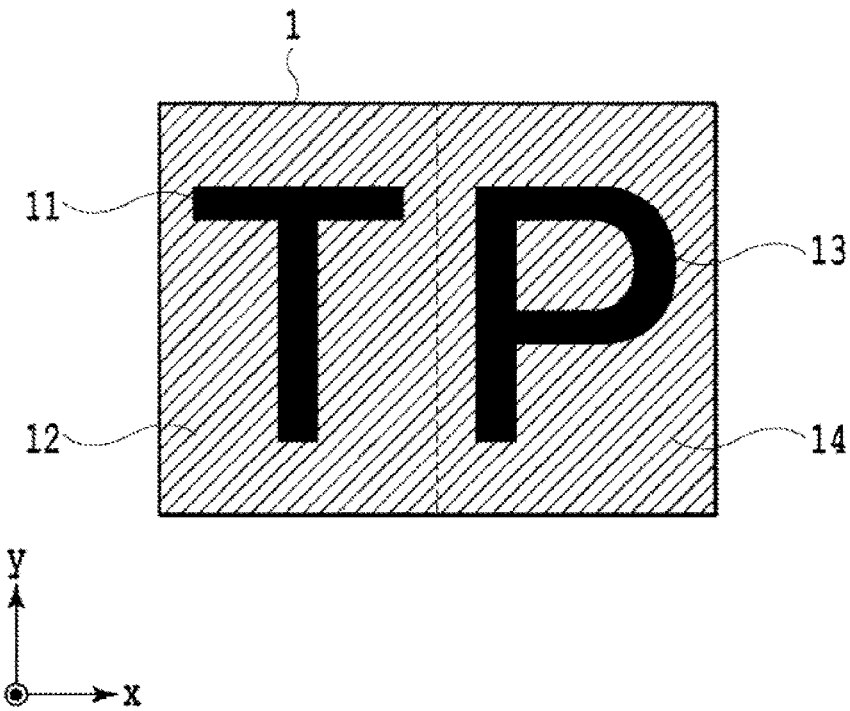
FIG. 1 is a plan view schematically illustrating a display related to a first embodiment of the present invention.
Figure 2:
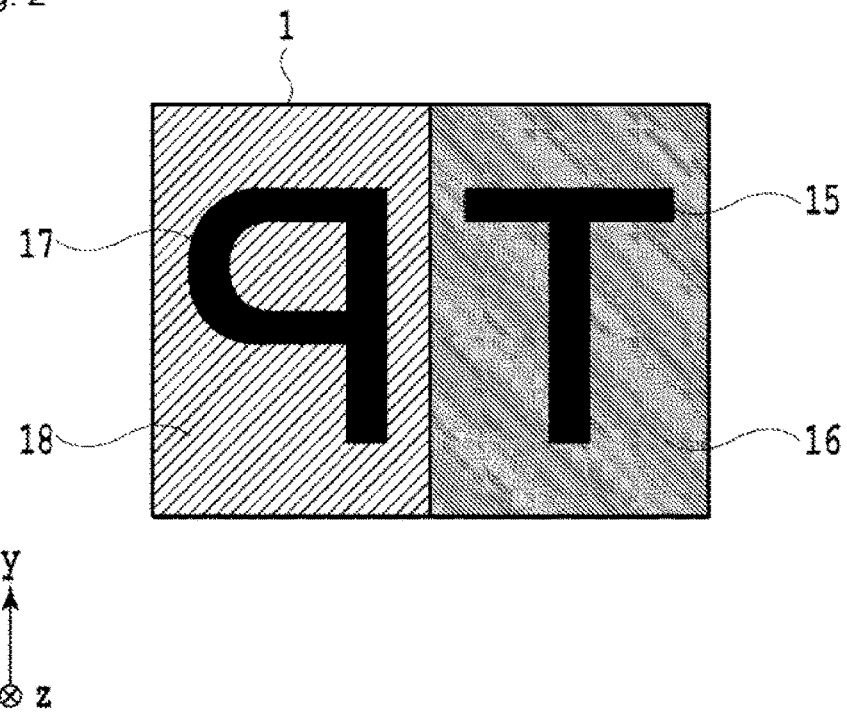
FIG. 2 is a plan view schematically illustrating an appearance of the display illustrated in FIG. 1, as observed from a back side.
Figure 3:
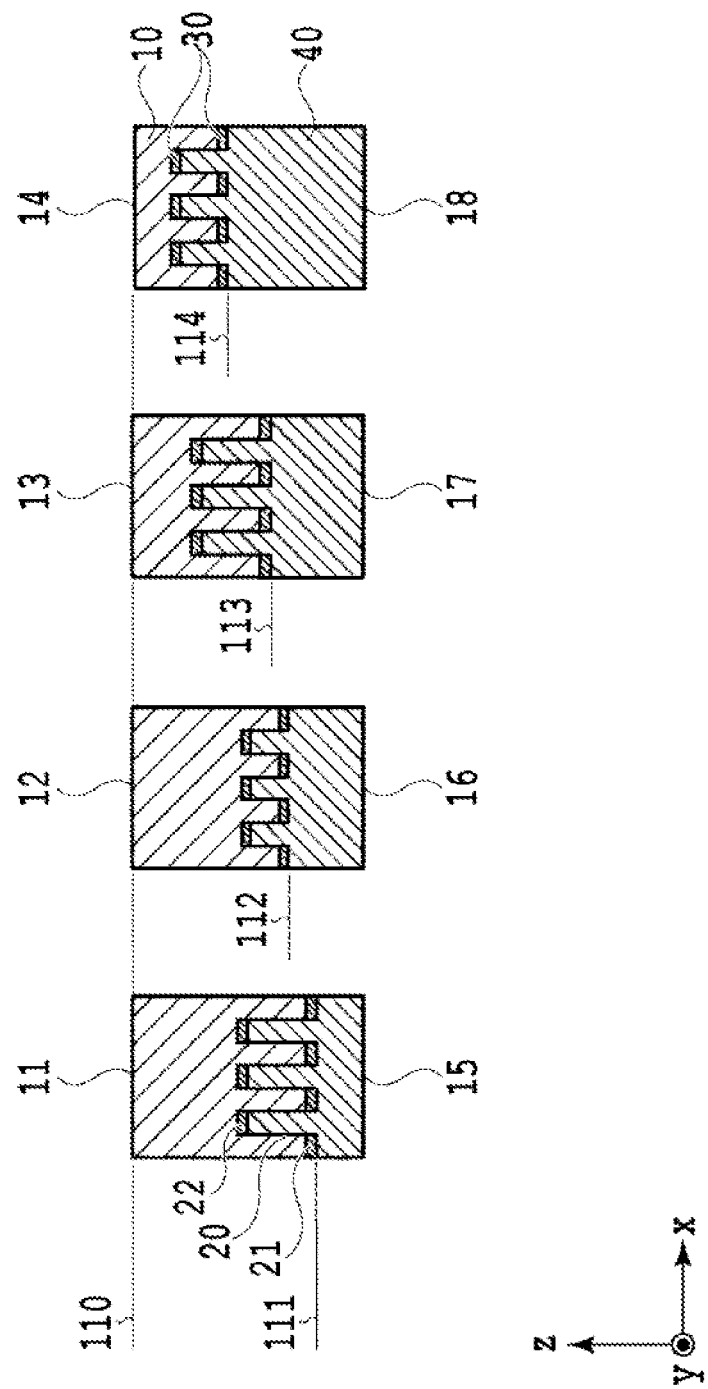
FIG. 3 is an enlarged cross-sectional view illustrating a layer configuration of relief structure-forming areas 11 to 14 illustrated in FIG. 1.

FIG. 1 is a plan view schematically illustrating a display 1 according to a first embodiment of the present invention. FIG. 2 is a plan view illustrating an appearance of the display 1 illustrated in FIG. 1, as observed from a back side. FIG. 3 is a cross-sectional view of relief structure-forming areas 11 to 14 of the display 1 illustrated in FIG. 1. In the Figures, the x direction and y direction are parallel to a display surface of the display 1, while being perpendicular to each other. Further, the z direction is perpendicular to the x and y directions. In the display 1, a relief structure-forming layer 10 side is defined to be a "front side" and a light scattering layer 40 side is defined to be a "back side".

First Representative Embodiment (Configuration of Display)

As shown in FIG. 1, the display 1 has a front side on which a plurality of relief structure-forming areas 11 to 14 are arranged to display the letters "TP". As will be described later, the relief structure-forming areas 11 and 12 show respective different display colors that are caused by the differences in structure height of a plurality of convexities formed inside the respective areas. The relief structure-forming area 13 has convexities whose structure height is substantially the same as that in the relief structure-forming area 11. Similarly, the relief structure-forming area 14 has convexities whose structure height is substantially the same as that in the relief structure-forming area 12. Accordingly, the relief structure-forming areas 11 and 13 show display colors of the same hue, while the relief structure-forming areas 12 and 14 show display colors of a hue different from that of 11 and 13.

In the relief structure-forming areas 11 and 13, the convexities have substantially the same structure height, but respective virtual planes 111 and 113, which are configured by a first surface 21, have different heights relative to a base surface 110. Similarly, in the relief structure-forming areas 12 and 14 as well, the convexities have substantially the same structure height, but respective virtual planes 112 and 114, which are configured by the first surface 21, have different heights relative to the base surface 110. In other words, in the relief structure-forming area 11, at least either of a difference in height between the first surface 21 and a second surface 22 and the height of the virtual plane 111 relative to the base surface 110 is different from that in the relief structure-forming areas 12 to 14. The same applies to the relief structure-forming areas 12 to 14.

As shown in FIG. 2, on a back side of the display 1, the direction of the letters "TP" is inverted to display a so-called mirror script. When the display 1 is observed from the back side as shown in FIG. 2, the letters are observed with a hue different from that observed from the front side as shown in FIG. 1, which is based on a principle that will be described later. In an observation from the front side as shown in FIG. 1, the letters "TP" and the background are represented by two colors. On the other hand, in an observation from the back as side shown in FIG. 2, an image is displayed with hues that are different between light scattering areas 15 to 18, or displayed with a total of four hues.

As shown in FIG. 3, the relief structure-forming layer 10, which is light transmissive, is provided with a plurality of convexities 20 configured by the first surface 21 which is smooth and substantially parallel to the base surface 110 of the display 1, and the second surface 22 which is substan-tially parallel to the first surface 21. The first and second surfaces 21 and 22 indicate an upper surface (top surface) and a lower surface (bottom surface), respectively, of the convexities 20. The first and second surfaces 21 and 22 are in a complementary relationship. Accordingly, either of the surfaces may serve as an upper surface, and the other one of them may serve as a lower surface. The same applies when the upper and lower surface relationship is inverted.

The relief structure-forming areas 11 to 14 are areas where the plurality of convexities 20 of the relief structure-forming layer 10 are formed. In the present invention, the expression "structure height of convexity 20" refers to a difference in height between the first and second surfaces 21 and 22. The display 1 has a plurality of relief structure-forming areas which are provided with the convexities 20 of different structure heights. In the configuration shown in FIG. 3, the differences in height in the relief structure-forming areas 11 and 13 are substantially the same, and the differences in height in the relief structure-forming areas 12 and 14 are substantially the same.

The difference in height in a set of the relief structure-forming areas 11 and 13 is different from the difference in height in a set of the relief structure-forming areas 12 and 14. When observed from the front side as shown in FIG. 1, the present display 1 realizes a multicolor display due to the presence of the plurality of relief structure-forming areas having different differences in height between the first and second surfaces 21 and 22.

In each of the relief structure-forming areas 11 to 14, a plane that includes the first surface 21 of the plurality of convexities is defined to be a "virtual plane". In the configuration shown in FIG. 3, virtual planes 111 to 114 of the relief structure-forming areas 11 to 14, respectively, have mutually different heights relative to the base surface 110.

The relief structure-forming areas 11 to 14 are obtained by replicating a relief structure from an original plate which is manufactured by means of lithography. For example, a plate-shaped substrate, with its one main surface being coated with a photosensitive resist, is placed on an XY stage, followed by radiating electron beams in a pattern to the photosensitive resist under computer control while the stage is moved, thereby forming an original plate. Then, a metal stamper is fabricated from the original plate by means of electrocasting or the like. Then, using the metal stamper as a matrix, a relief structure is replicated. Specifically, a thermoplastic resin, a thermosetting resin or a photo-curable resin is coated, first, onto a film or sheet of thin transparent base made of polyethlene terephthalate (PET) or polycarbonate (PC). Then, the coated resin layer is brought into intimate contact with the metal stamper, and in this state, heat or light is applied to the resin layer. After completion of plastic deformation or curing of the resin, the metal stamper is separated from the resin layer, thereby obtaining a relief structure.

Further, a light reflection layer 30 is formed in conformity with the plurality of convexities provided to the relief structure-forming layer 10. The light reflection layer 30 covers at least a part of the relief structure-forming layer 10. Further, the light scattering layer 40 is formed on a light reflection layer 30 side of the relief structure-forming layer 10. The light scattering layer 40 covers the light reflection layer 30. If there is an area that is not covered with the light reflection layer 30 in the relief structure-forming layer 10, the light scattering layer covers the non-covered area of the relief structure-forming layer 10. A surface which is opposite to the light reflection layer 30 side of the light scattering layer 40 is a plane that is substantially parallel to the base surface 110. The light scattering layer 40 has light scattering performance which is achieved, not by the relief pattern whose structure is exposed to the surface, but by light scattering elements contained inside the layer as will be described later. In the configuration shown in FIG. 3, the relief structure-forming layer 10 is entirely covered with the light reflection layer 30, while the light reflection layer 30 is covered with the light scattering layer 40.

The light scattering layer 20 has a plurality of light scattering areas at positions corresponding to the respective plurality of relief structure-forming areas. In the configuration shown in FIG. 3, the light scattering areas 15 to 18 are provided so as to correspond to the relief structure-forming areas 11 to 14, respectively, and be located at the same respective positions in the z-axis direction. The light scattering areas 15 to 18 have mutually different heights in accord with the respective heights of the virtual planes 111 to 114 relative to the base surface 110.

Materials that can be used as the relief structure-forming layer 10 include, for example, synthetic resins, such as photo-curable resins, thermoplastic resins, or thermosetting resins.

A metal layer can be used as the light reflection layer 30, the metal layer being made of a metallic material, such as aluminum, silver, gold, or an alloy of these materials. Alternatively, a dielectric layer may be used as the light reflection layer 30, the dielectric layer being made of a material such as zinc sulfide (ZnS), titanium oxide (TiO2), or the like. Alternatively, a dielectric multilayer film may be used as the light reflection layer 30. The dielectric multilayer film in this case is a lamination of dielectric layers having different refractive indexes between adjacent layers. For example, the light reflection layer 30 can be formed by means of a vapor phase deposition method, such as vacuum vapor deposition or sputtering.

The light reflection layer 30 efficiently reflects and emits light incident on the display 1 to contribute to increasing the quantity of reflected light. The light reflection layer 30 may be formed so as to entirely cover the plurality of convexities 20 of the relief structure-forming layer 10, or may be formed so as to cover only some of the convexities. The light reflection layer 30 covering only a part of the relief structure-forming layer 10 may be graphically patterned into design letters, symbols, or the like. A patterned light reflection layer 30 is obtained, for example, by forming the light reflection layer 30 as a continuous film by a vapor phase deposition method, followed by partially dissolving the film such as by chemicals. Alternatively, after forming the light reflection layer 30 as a continuous film, the film may be partially separated from the relief structure-forming layer 10 using an adhesive material having a higher adhesive force relative to the light reflection layer 30, compared to the sticking force of the light reflection layer 30 relative to the relief structure-forming layer 10, thereby obtaining a patterned light reflection layer 30. Alternatively, a method of performing vapor phase deposition using a mask or a method of using a lift-off process may be used.

The light scattering layer 40 has light transmission performance and also at least partially has light scattering performance. The light scattering layer 40 may be formed of a light transmissive synthetic resin in which spherical microparticles that are capable of scattering light are scattered. The spherical microparticles may be resin particles or inorganic particles mainly composed of a metallic compound. The resins that can be used include silicone resins, acrylic resins, styrene resins, acrylic styrene resins, melamine resins, and the like. The metallic compounds that can be used include zinc oxide, alumina, titanium oxide, and the like. Alternatively, a semi-transparent ink layer having light scattering performance may be used.

It should be noted that the display 1 may further include a layer, such as a printed layer and/or a surface protective layer, which is able to achieve other functions.

(Regarding Optical Performance of Diffraction Grating)

Prior to describing the visual effects achieved by the concavo-convex structure formed in the relief structure-forming areas of the display 1, there is described first a relationship between the grating constant of a diffraction grating (pitch of grooves), the wavelength of illumination, the incident angle of illumination, and the emission angle of diffracted light.

When illumination is applied to a diffraction grating by means of an illumination source, the diffraction grating emits strong diffracted light in a specific direction, according to the traveling direction and the wavelength of the illumination that is incident light.

An m-order diffracted light beam (m=0, ±1, ±2, . . . ) has an emission angle β which can be calculated from the following Formula (1) when the light travels in a plane perpendicular to a longitudinal direction of the grooves of the diffraction grating.

[Math. 1]

$$d = \frac{m\lambda}{\sin\alpha - \sin\beta} \quad (1)$$

In Formula (1), d represents a grating constant of a diffraction grating, m represents a diffraction order, and λ represents a wavelength of incident light and diffracted light. Further, α represents an emission angle of a 0-order diffracted light beam, i.e. specular reflection RL. In other words, α has an absolute value which is equal to the incident angle of illumination. In the case of a reflection grating, the incident direction of illumination and the emission direction of specular reflection are symmetric about a normal line NL of an interface where the diffraction grating is provided.

When the diffraction grating is of a reflection type, the angle α is 0° or more, but less than 90°. Let us discuss the case where illumination is applied from a direction oblique to the interface where the diffraction grating is provided. In this case, taking two angular ranges with an angle in a normal direction, i.e. 0°, as being a boundary value, the angle β will have a positive value if the emission directions of the diffracted light and the specular reflection fall in the same angular range, but will have a negative value if the emission direction of the diffracted light and the incident direction of the illumination fall in the same angular range.

Figure 4:
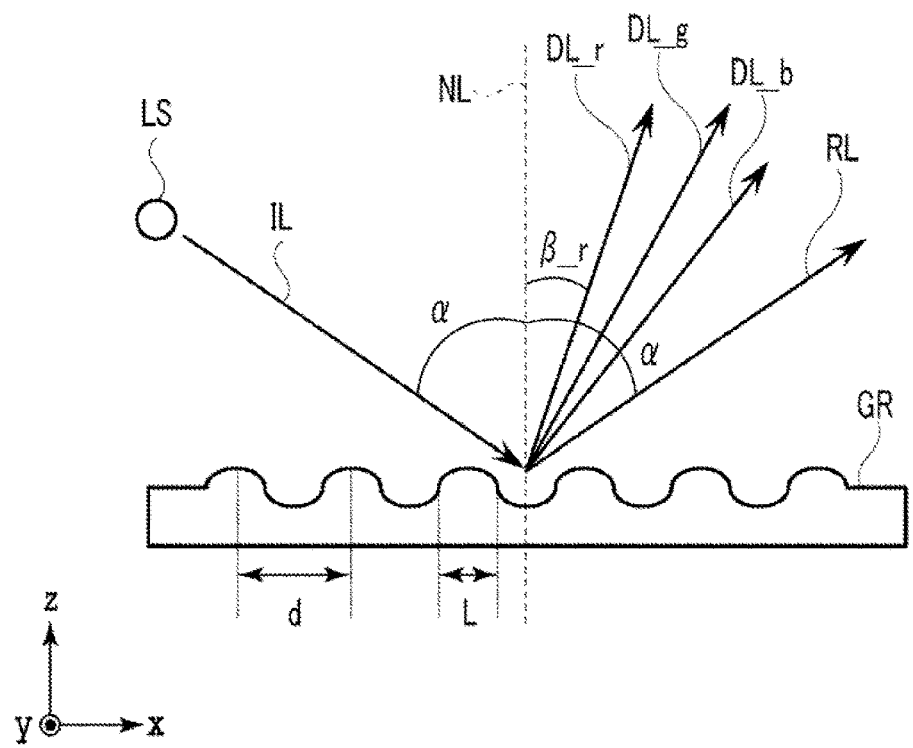
FIG. 4 is a diagram schematically illustrating a state where a narrow-pitch diffraction grating emits +primary diffracted light.
Figure 5:
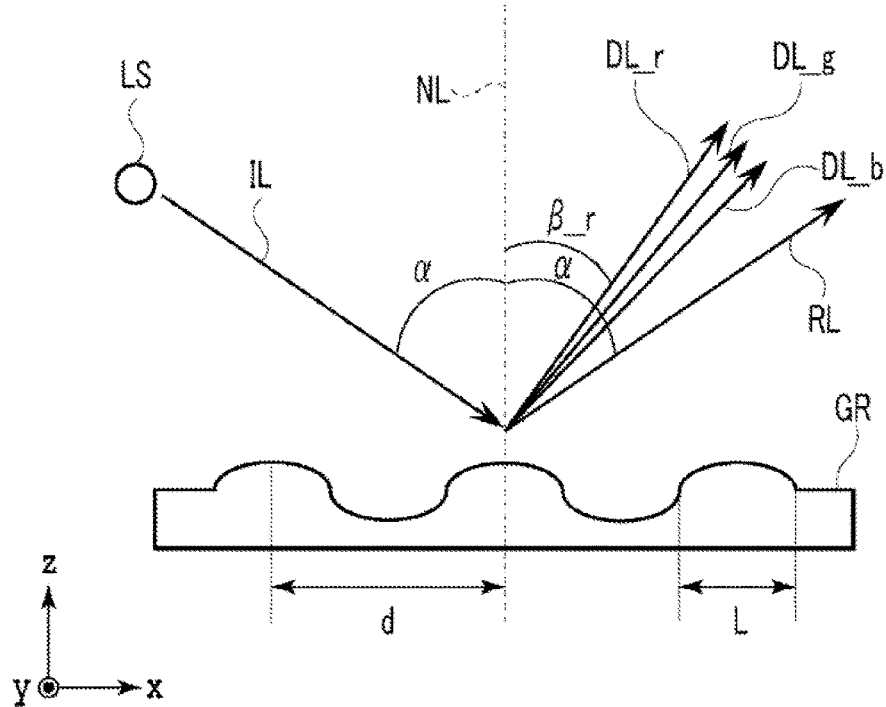
FIG. 5 is a diagram schematically illustrating a state where a wide-pitch diffraction grating emits +primary diffracted light.

FIG. 4 is a diagram schematically illustrating the specular reflection RL and primary diffracted light beams emitted by a diffraction grating having a small grating constant d. FIG. 5 is a diagram schematically illustrating a state where a diffraction grating having a large grating constant d emits the specular reflection RL and primary diffracted light beams.

A point source LS radiates white illumination IL that contains a light component R whose wavelength is in a red color area, a light component G whose wavelength is in a green color area, and a light component B whose wavelength is in a blue color area. The light components G, B and R radiated by the point source LS are incident on a diffraction grating GR at the incident angle α. The diffraction grating GR emits a diffracted light beam GL_g as a part of the light component G at an emission angle β_g (not shown), emits a diffracted light beam GL_b as a part of the light component B at an emission angle β_b (not shown), and emits a diffracted light beam GL_r as a part of the light component R at an emission angle β_r. Although not shown, the diffraction grating GR also emits diffracted light beams of other orders at angles each derived from Formula (1).

In this way, under predetermined illumination conditions, a diffraction grating emits diffracted light beams at different angles, depending on the wavelength. Therefore, under a white light source, such as the sun or a fluorescent light, a diffraction grating emits light of different wavelengths at different angles. Accordingly, under such illumination conditions, a diffraction grating shows a display color which changes in an iridescent manner according to the change of an observation angle. Further, as the grating constant d is larger, diffracted light is emitted in a direction that is more approximate to the specular reflection RL, making the difference between the emission angles, β_g, β_b and β_r smaller.

The following is a description on a relationship between: the grating constant of a diffraction grating, the wavelength of illumination, and the intensity of diffracted light in an emission direction of the diffracted light (diffraction efficiency).

According to Formula (1), when illumination is incident on a diffraction grating having the grating constant d at the incident angle α, the diffraction grating emits a diffracted light beam at the emission angle β. In this case, the diffraction efficiency in respect of the light having the wavelength λ changes, depending such as on a grating constant of the diffraction grating and the depth of grooves, and can be calculated from the following Formula (2).

[Math. 2]

$$\eta = \left(\frac{2}{\pi}\right)^2 \times \sin^2\left(\frac{2\pi}{\lambda} \times \frac{r}{\cos\theta}\right) \times \sin^2\left(\frac{\pi}{d} \times L\right) \quad (2)$$

In the formula, η represents a diffraction efficiency (value from 0 to 1), r represents a depth of grooves of the diffraction grating, L represents a width of each groove of the diffraction grating, d represents a grating constant, θ represents an incident angle of illumination, and λ represents a wavelength of illumination and diffracted light. It should be noted that Formula (2) is established for a diffraction grating having a rectangular wave-like cross section perpendicular to a longitudinal direction of grooves, the grooves being comparatively shallow.

As is obvious from Formula (2), the diffraction efficiency η changes according to the depth r of the grooves, the grating constant d, the incident angle θ, and the wavelength λ. Further, the diffraction efficiency η tends to be gradually lowered as the diffraction order m becomes higher.

(Regarding Optical Performance Achieved by Relief Structure-Forming Layer)

The following description deals with optical performance achieved by the relief structure-forming areas which are formed in the relief structure-forming layer 10.

Figure 6:
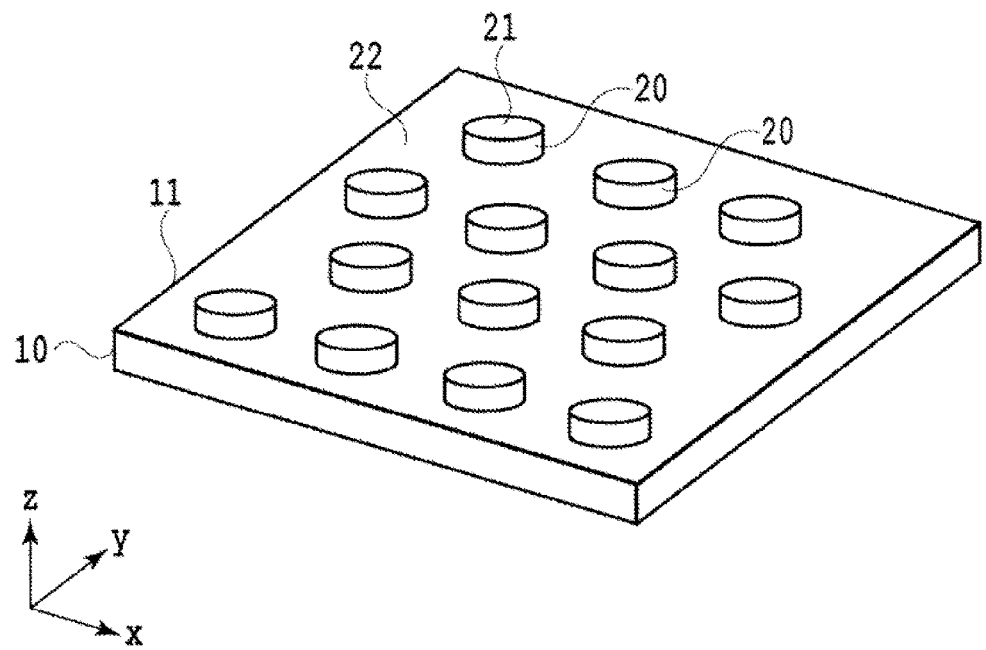
FIG. 6 is a perspective view illustrating an example of a structure that can be applied to the relief structure-forming areas of the display according to the first embodiment.

FIG. 6 is a perspective view schematically illustrating an example of a concavo-convex structure that can be used for a relief structure-forming area. The relief structure-forming area 11 includes the second surface 22, which is smooth, and the plurality of convexities 20 each having an upper surface and a side surface. The upper surface of each convexity 20 is parallel to the second surface 22 and serves as the first surface 21 which is smooth.

It should be noted that FIG. 6 shows an example in which the relief structure-forming area 11 is formed of the plurality of convexities 20, with the first surface 21 configuring the upper surface (top surface) of each convexity 20 and the second surface 22 configuring a lower surface (bottom surface) of each convexity 20. However, in the case where a plurality of concavities are formed in the relief structure-forming area and the second surface is configured by a plurality of bottom surfaces of the concavities as well, the optical performance set forth below is similar. Hereinafter, the optical performance is described with the illustration of a plurality of convexities, omitting illustration and description of a plurality of concavities.

In FIG. 6, the convexities 20, each being in a circular shape, are arranged in an orderly manner relative to a predetermined direction on one surface of the relief structure-forming area 11. The arrangement in an orderly manner refers to the convexities 20 being arrayed with an even interval therebetween or with regularity. The orderly arranged plurality of convexities 20 form, for example, a square grating, a rectangular grating or a triangular grating.

Figure 7:
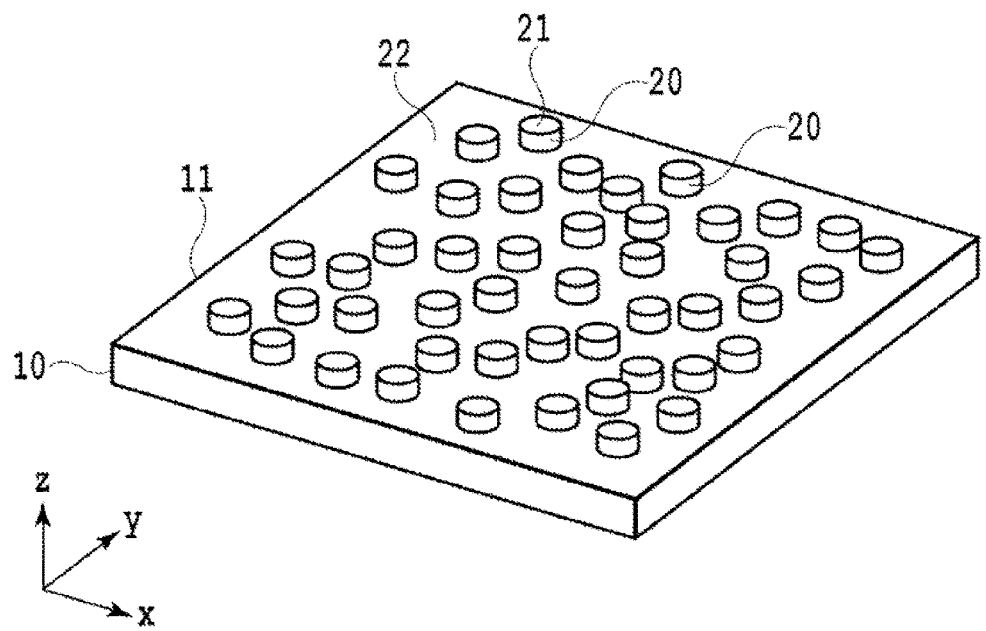
FIG. 7 is a perspective view illustrating another example of a structure that can be applied to the relief structure-forming areas of the display according to the first embodiment.

FIG. 7 is a perspective view illustrating an example of another structure that can be applied to a relief structure-forming area. The convexities 20 in a circular shape are arranged in a disordered manner (arranged at random) in the relief structure-forming area 11. In the case where the convexities 20 are arranged in a disordered manner, the convexities 20 may be formed in a mutually overlapped state.

Each convexity 20 may be in any polygonal shape, such as an elliptic shape, an octagonal shape, a star shape or a cross shape. Alternatively, convexities of different shapes may be combined together in a relief structure-forming area.

Figure 8:
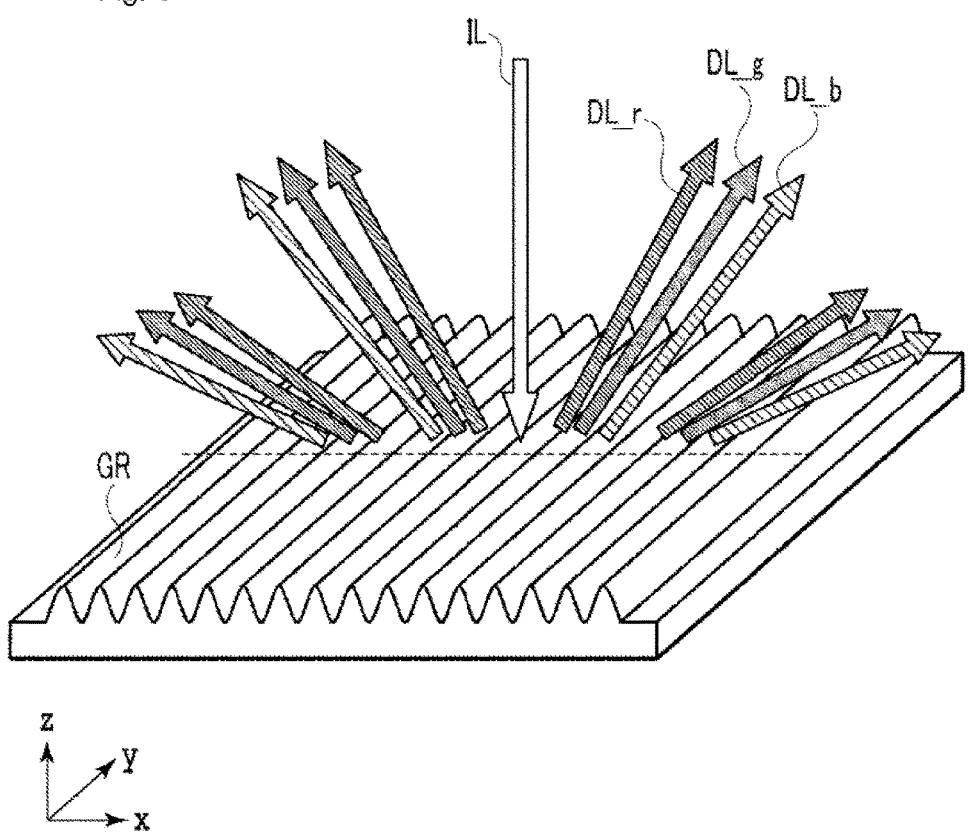
FIG. 8 is a schematic diagram illustrating a state of diffracted light emitted from a diffraction grating.

FIG. 8 is a schematic diagram illustrating a state of diffracted light which is emitted when the illumination IL of white color is radiated onto a normal diffraction grating. FIG. 8 shows a diffraction grating GR composed of a plurality of grid lines which are regularly formed in a direction parallel to the y axis. When the illumination IL is incident on the diffraction grating GR, the diffracted light beams DL_r, DL_g and DL_b are emitted in a direction perpendicular to the y axis (longitudinal direction of the grid lines) (in an x-axis direction, i.e. in an xz plane).

Figure 9:
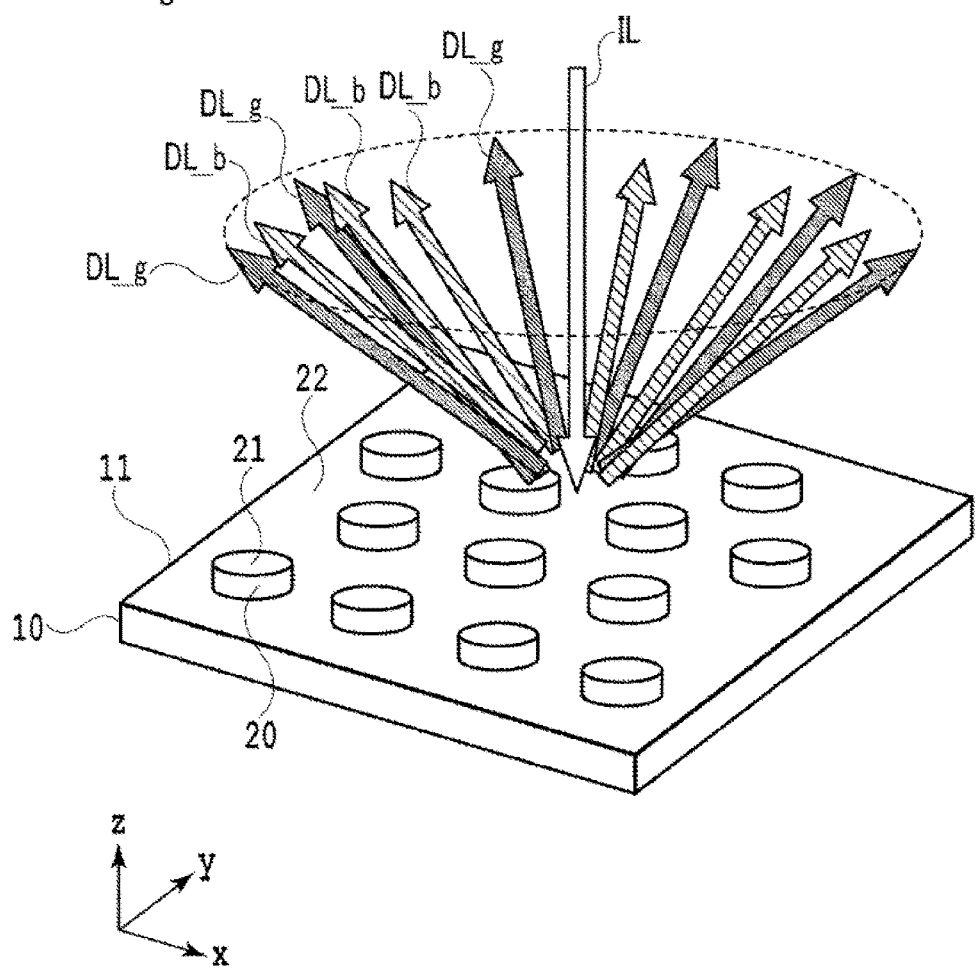
FIG. 9 is a schematic diagram illustrating a state of light emitted from a relief structure-forming area.
Figure 10:
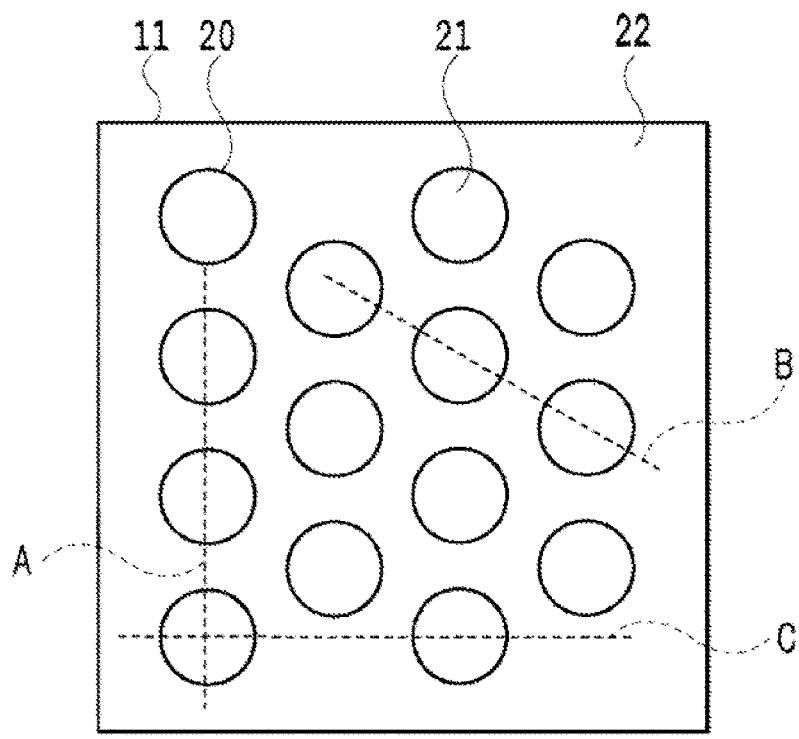
FIG. 10 is a plan view illustrating the relief structure-forming area illustrated in FIG. 6.
Figure 10:
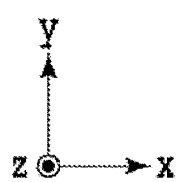

On the other hand, FIG. 9 is a schematic diagram illustrating a state of diffracted light which is emitted from the relief structure-forming area 11 having the plurality of convexities 20. FIG. 10 is a plan view illustrating the relief structure-forming area 11 illustrated in FIGS. 6 and 9.

When white illumination is incident on a structure as shown in FIG. 9, diffracted light is emitted by the plurality of convexities 20 which are formed in the relief structure-forming area 11, or by a concavo-convex structure configured by the first surface 21 and the second surface 22 surrounding the first surface 21. As shown in FIG. 9, in a structure where the convexities 20 are orderly arranged being separated from each other, diffracted light beams are emitted not only in the x-axis direction (in an xz plane) but also in directions of multiple azimuthal angles on an xy plane (i.e. in a three-dimensional manner).

As indicated in FIG. 10 by the dashed lines A, B and C, although the plurality of convexities 20 are configured to be orderly arranged, the arrangement interval (grating constant d) appears different depending on the azimuth. Therefore, the relief structure-forming area 11 shown in FIGS. 9 and 10 can be a concavo-convex structure having various arrangement intervals (grating constants d). When light is incident on such a structure, concavo-convex structures of different grating constants d can be multiply superimposed. Accordingly, it is not that a diffracted light beam is emitted at an emission angle that is different on a wavelength-basis, but that the light beams of various wavelengths are emitted at various angles, being superimposed with each other.

Further, FIG. 9 shows a state where the illumination IL is incident on one point of the relief structure-forming area 11. However, as a matter of fact, the illumination source has an area having some spatial extent and thus the illumination IL is incident in a planar manner, instead of being incident on one point. Accordingly, the light observed by an observer at a fixed point is a combination of light beams having wavelengths of some range. As a result, a color created by the light beams of a plurality of wavelengths is observed.

As shown in Formula (2), the diffraction efficiency, i.e. light quantity, of diffracted light emitted from a diffractive structure changes depending on the wavelength. Particularly, when a grid line width L and a pitch d of the grid lines are taken as being fixed, the diffraction efficiency η is univocally determined according to the height r (corresponding to the difference in height between the first and second surfaces 21 and 22) of the diffraction grating and the wavelength λ of the illumination.

Therefore, when the relief structure-forming area 11 is observed from a fixed point, the wavelength components of visible light do not uniformly reach the eye. This is because the diffraction efficiency of the light of a specific waveform is lowered due to the interference of the light which is in accord with the height (difference in height between the first and second surfaces 21 and 22) of the convexities 20 provided in the relief structure-forming area. As a result, the light that reaches the observer is decreased in light quantity in respect of the specific wavelength components of the incident white-colored illumination. Accordingly, when the relief structure-forming area 11 is observed under the white illumination source, the observer will perceive the light in which there is a difference in the light quantity on a wavelength-basis.

For example, let us take a situation where a relief structure-forming area provided with convexities of some height is observed, and in the observation, the diffraction efficiency of the light of blue (wavelength of 460 nm) is lowered and thus the wavelength components that reach the observer's eye are red (wavelength of 630 nm) and green (wavelength of 540 nm). In this situation, the observed color is yellow. Let us assume a situation where another relief structure-forming area provided with convexities of another height is observed, and in the observation, the diffraction efficiency of the light having red wavelength components is lowered and thus the wavelength components of the diffracted light that reach the observer's eye are of green and blue. In this situation, the observed color is cyan. As an example, FIG. 9 shows a state where the illumination IL from the white illumination source is incident on the relief structure-forming area 11, with the diffracted light beam DL_r (not shown) not being emitted due to the lowering of the diffraction efficiency, but with the green and blue diffracted light beams DL_g and DL_b being emitted.

The display color displayed according to the above principle will not be observed by an observer if he/she is at a position where the diffracted light does not reach. Thus, the diffraction grating is able to realize two states, one being a state where the display color can be recognized, and the other being a state where the display color cannot be recognized, depending on the position of the illumination source or the observer. This is what is different from a normal printed object from which substantially the same color can be perceived in a great deal of range.

Diffracted light is emitted as well in the relief structure-forming area 11 shown in FIG. 7 where the plurality of convexities 20 are arranged in a disordered manner. In the relief structure-forming area 11 shown in FIG. 7, the grating constant d shown in Formula (1) has various values. Accordingly, the emission angle of the diffracted light variously changes according to the illuminating position of the illumination IL. Therefore, similar to the structure shown in FIG. 6 where the plurality of convexities 20 are arranged in an orderly manner, the diffracted light that reaches an observation point is the light of multiple wavelengths with an exception of the light of a specific wavelength. At the observation point, a mixed color of these light beams is observed. Compared to the structure of an orderly arrangement as shown in FIG. 6, use of the relief structure-forming area 11 having the plurality of convexities 20 arranged in a disorderly manner will result in emitting the light of various wavelengths across a wider angle range. This effect can contribute to realizing a display in which the iridescent color change caused by diffraction is more suppressed.

Thus, on the condition that the light from an illumination source is incident on the surface of the display 1 and the incident light is reflected and emitted by the relief structure of the display 1, an observer can visually perceive the light. This condition is defined to be a "normal illumination condition". For example, the "normal illumination condition" includes a condition where illumination such as of a fluorescent light of an interior of a normal room is substantially vertically incident on the surface of the display 1 and an observer visually observes the display 1, or a condition where illumination such as of the sun is substantially vertically incident on the surface of the display 1 outside a room, and an observer visually observes the display 1. Herein, an expression "normal illumination" refers to the light from a fluorescent light in the interior of a room, and the illumination of a white color such as of the sun outdoors. Further, an expression "condition other than the normal illumination condition" refers to a condition where an observer cannot perceive the light emitted from the display 1. For example, the "condition other than the normal illumination condition" includes a condition where the light of illumination is substantially horizontally incident (i.e. at a large incident angle) on the surface of the display 1 but the light is hardly emitted from a relief structure of the display 1, or a condition where light is emitted by diffraction from a relief structure of the display 1 but an observer sees the display 1 from an angle at which the diffracted light does not reach the observer.

In order to provide a structure that enables observation of a color composed of the light of a plurality of wavelengths under the normal illumination condition, it is desirable that each of the convexities 20 orderly arranged as shown in FIG. 6 (if each convexity 20 has a circular first surface 21, the diameter of the circle) has a slightly larger structure with a dimension of about 5 μm to about 10 μm. Adjacent convexities 20 may have an arrangement interval, for example, ranging from about 5 μm to 10 μm. As is apparent from Formula (1) and FIG. 5, the differences between the emission angles of the diffracted light for each wavelength are small in the case of a large structure with a dimension and an arrangement interval falling in the above range. Accordingly, irrespective of the change in the position of an illumination source and/or of an observer, the display color does not cause a so-called iridescent change, thereby enabling stable observation of the color created by the light of a plurality of wavelengths.

On the other hand, it is desirable that each of the convexities 20 in the disordered arrangement as shown in FIG. 7 has a slightly smaller structure with a dimension of about 0.3 µm to about 5 µm. Further, adjacent convexities 20 may have an arrangement interval ranging, for example, from 0.3 µm to 5 µm. As is apparent from Formula (1), the differences between the emission angles of the diffracted light for each wavelength are large in the case of the small structures that are formed with a small arrangement interval therebetween. Therefore, in the structure of a disordered arrangement, an iridescent color change tends to be easily caused, while the light of multiple wavelengths is permitted to easily reach an observation point. Further, as is apparent from Formula (1) and FIG. 4, the disordered arrangement of the small structures increases the differences between the emission angles of the diffracted light and accordingly provides an advantage of enabling observation of a display color of multiple light beams in a wide range.

The relief structure-forming areas each use the structure in which the differences in height between the first and second surfaces 21 and 22 forming the concavo-convex structure are substantially the same. Such a structure has an effect of lowering the diffraction efficiency of the light of a specific wavelength by light interference, and suppressing lowering of the diffraction efficiency of the light of other wavelengths. Therefore, the structure in which the differences in height between the first and second surfaces 21 and 22 are substantially the same enables display of a unique chromatic color created by the light of multiple wavelengths which do not lower the diffraction efficiency. If the differences in height between the first and surfaces 21 and 22 forming the concavo-convex structure are not substantially the same, the wavelength range of light, in which the diffraction efficiency is lowered, is enlarged. As a result, the chroma of the obtained display color is lowered and approximated to a white color with a wavelength distribution which is hardly different from that of the incident light. In a generally used light scattering structure, fine structures are irregularly arranged and the depths of the structures are also irregular. Accordingly, the performance of lowering the diffraction efficiency of the light of a specific wavelength is not available, resultantly allowing the incident white light to be scattered and emitted as it is to thereby present a white display color. Therefore, for enabling display of a chromatic and specific unique color, the differences in height between the first and second surfaces 21 and 22 are required to be substantially the same.

The differences in height between the first and second surfaces 21 and 22 for exerting such optical effects are within a range, for example, of from 0.1 µm to 0.5 µm, typically from 0.15 µm to 0.4 µm. Smaller differences in height between the first and surfaces 21 and 22 lowers the chroma of the light of the chromatic color, which is emitted from the relief structure-forming area. Further, smaller differences in height increase the effect on the optical characteristics of the relief structure-forming area, the effect being caused by slight change in an external factor at the time of manufacture (e.g., change in the conditions and environment of a manufacturing apparatus, and/or material compositions). On the other hand, large differences in height make it difficult to form the relief structure-forming area with high accuracy in shape and dimension.

Each convexity has a side surface which typically is perpendicular to the first and second surfaces. The side surface may be inclined relative to the first and second surfaces. In this case, however, the side surface of each convexity is desirably more vertical. As the side surface more inclines, the chroma of the display color is more lowered.

As shown in FIG. 9, the structure used for the relief structure-forming area emits diffracted light in the directions of multiple azimuthal angles on the xy plane. Accordingly, a color configured by a plurality of wavelengths can be observed, irrespective of a slight change in the position of the light source or the direction of the observation. This can help avoid or decrease the occurrence of the phenomenon of an iridescent change in a display color, which phenomenon would otherwise have occurred in a conventional diffraction grating under the normal illumination condition.

Figure 11:
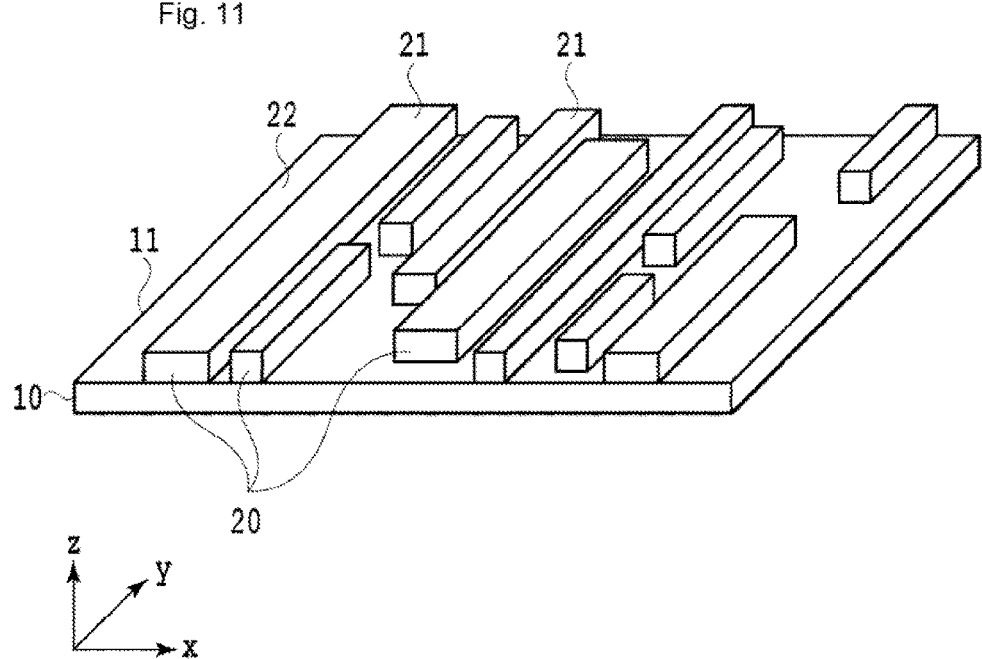
FIG. 11 is a perspective view illustrating an example of a structure having directivity that can be applied to the relief structure-forming areas of the display according to the first embodiment.

Still another structure that can be used for a relief structure-forming area includes a structure having directivity. FIG. 11 is an example of the relief structure-forming area 11 composed of a plurality of linearly structured convexities 20, each being in a shape extended in the y-axis direction. Each convexity 20 has a width, for example, ranging from 0.2 µm to 10 µm, typically ranging from 0.3 µm to 5 µm. Each convexity 20 has a length ratio relative to the width, for example, of two or more, or typically, ten or more. A smaller ratio than this will make it difficult for an observer to perceive optical anisotropy described later.

The plurality of convexities 20 are arrayed so as not to configure a diffraction grating or a hologram which emits diffracted light that can be perceived with the naked eye. Herein, distances between the center lines of adjacent convexities 20 in a width direction are irregular. Either the distances between the centers of the convexities 20 or the widths of the convexities may be equal to each other.

The convexities that are adjacent in a width direction have an arrangement interval therebetween, ranging, for example, from 0.2 µm to 10 µm, typically from 0.3 µm to 5 µm. The convexities 20 have various lengths. The positions of the convexities 20 in a longitudinal direction are irregular. The convexities 20 may have an equal length, or may be regularly arranged in a longitudinal direction.

Figure 12:
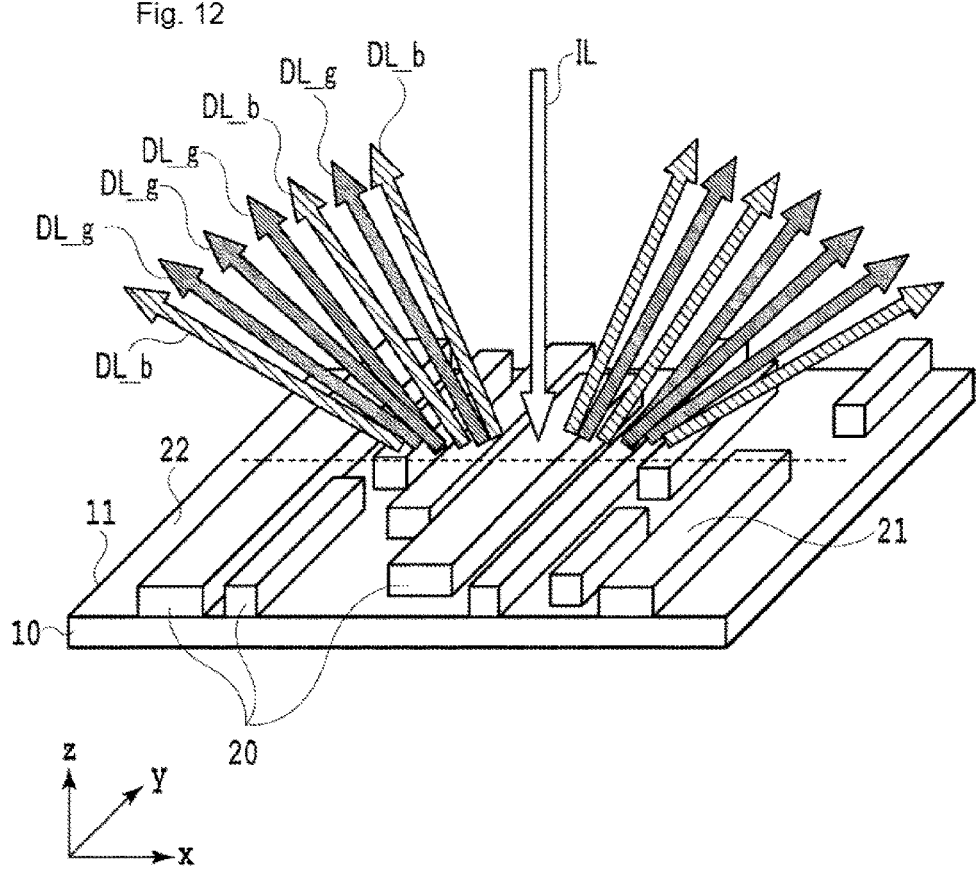
FIG. 12 is a schematic diagram illustrating a state of light emitted from the relief structure-forming area illustrated in FIG. 11.

As shown in FIG. 12, when the illumination IL in white color is incident on such a structure from vertically above the display 1, the incident illumination IL emits the diffracted light beams DL_g and DL_b in the xz plane, along a direction perpendicular to the longitudinal direction of the convexities 20 (x-axis direction), but does not emit diffracted light beams in the longitudinal direction of the convexities 20 (y-axis direction). In FIG. 12, the height of the convexities 20 (i.e. the difference in height between the first and second surfaces 21 and 22) is permitted to be the same as the height of the structure shown in FIG. 10 to show a state where the diffraction efficiency of the red diffracted light beam DL_r (not shown) is lowered and a cyan display color is obtained.

In this way, provision of a structure having directional properties (directivity) enables control of an azimuthal direction in which the diffracted light is emitted. In this case as well, by equalizing differences in height between the first and second surfaces 21 and 22, the diffraction efficiency of light with a specific wavelength is lowered in accord with the differences in height. Accordingly, the diffracted light observed in a direction perpendicular to a longitudinal length of the convexities 20 (x-axis direction) displays a unique chromatic color. Further, since the plurality of convexities 20 are arranged at random, the display color does not change in an iridescent manner. Accordingly, the same unique chromatic color is displayed in a wide range in a direction perpendicular to a longitudinal length of the convexities 20 (x-axis direction).

When S is taken as an area of an orthogonal projection of the relief structure-forming area 11 onto a plane parallel to the first and second surfaces 21 and 22, the ratio of an area S1 of the first surface 21 to the area S as expressed by S1/S ranges, for example, from 20% to 80%, typically 40% to 60%. Further, the ratio of an area S2 of the second surface 22 to the area S as expressed by S2/S ranges, for example, from 80% to 20%, typically from 60% to 40%. Further, the ratio of the sum of the areas S1 and S2, i.e. S1+S2, to the area S as expressed by (S1+S2)/S ranges, for example, from 10% to 100%, typically from 50% to 100%. A display of highest luminance can be achieved when the ratios S1/S and S2/S are each 50%. According to an example, when one of the ratios S1/S and S2/S is 20% and the other is 80%, the luminance that can be achieved is about 30% of the luminance that can be achieved when the ratios S1/S and S2/S are each 50%.

The light which is incident on the concavo-convex structure or the diffraction grating formed on the relief structure-forming layer 10 of the display 1 is emitted as emission light in a predetermined direction according to the principle of diffraction. Besides, the specular reflection (regular reflection) RL is also emitted in a specular direction relative to an incident angle direction of the incident light. This light corresponds to a component of light that is emitted without being influenced by the shape of the concavo-convex structure. Generally, when an observer sees the display 1 provided with the light reflection layer 30, the observer observes the display 1 so that the specular reflection RL does not penetrate into the eye because the specular light RL has a large light quantity and causes glare. Illustration of the specular reflection RL is omitted from FIG. 12.

(Regarding Visual Effects Realized by the Display)

Figure 13:
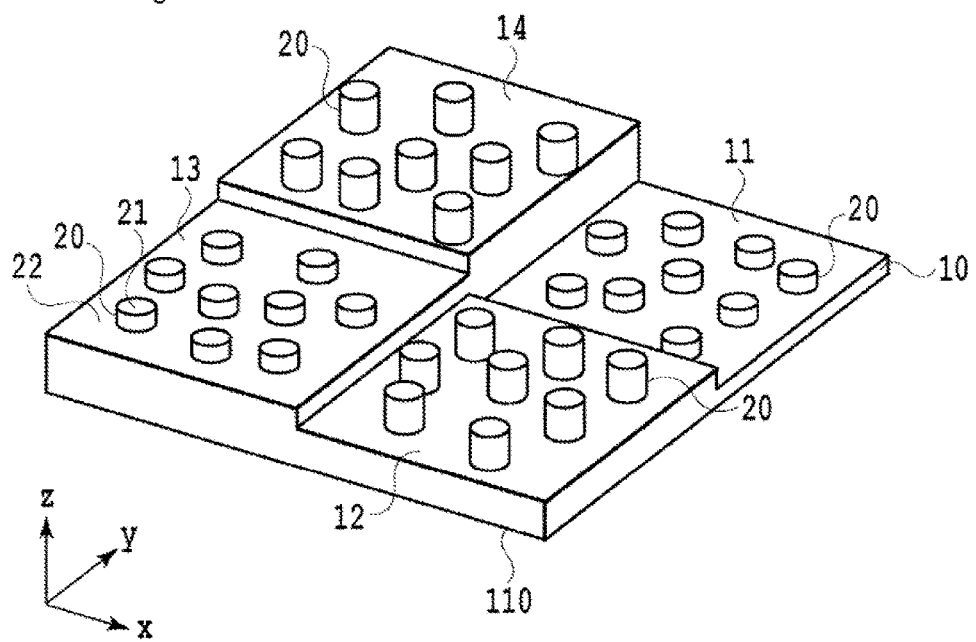
FIG. 13 is an enlarged perspective view illustrating an example of a structure of the display according to the first embodiment.

FIG. 13 is a schematically enlarged perspective view of an example of the configuration of the relief structure-forming layer 10 that can be used in the present embodiment. In FIG. 3, the plurality of convexities have been illustrated as being configured downward along the z axis (downward in the drawing sheet). In FIG. 13, the convexities are illustrated as being configured upward along the z axis (upward in the drawing sheet).

Each of the relief structure-forming areas 11 to 14 is formed with the plurality of convexities 20. In other words, the concavo-convex structure is configured by the first and second surfaces 21 and 22. The plurality of convexities 20 in the relief structure-forming areas 11 and 13 have substantially the same height. Also, the plurality of convexities 20 in the relief structure-forming areas 12 and 14 have substantially the same height.

The relief structure-forming areas 11 to 14 have different heights from the base surface 110. In other words, as shown in FIG. 3, the heights of the virtual planes 111 to 114 (planes each configured by the first plane 21) relative to the base surface 110 are different from each other. In FIG. 13, the heights of the virtual planes 111 to 114 (planes each configured by the first surface 21) relative to the base surface 110 are configured to be increased in the order of the relief structure-forming areas 11, 12, 13 and 14.

The relief structure-forming layer 10 is configured by a transparent or semi-transparent, desirably, colorless and transparent material. Therefore, the display 1 can be observed not only from the side where the concavo-convex structure is provided, but also from the base surface 110 side. The relief structure-forming layer has a smooth first principal surface (base surface 110) and a second principal surface which is opposite to the first principal surface, with the concavo-convex structure being at least partially formed in the second principal surface.

In the present display 1, the light reflection layer 30 is further laminated on the relief structure-forming layer 10. The light reflection layer 30 is a thin film layer configured in conformity with the relief structure-forming layer 10 to contribute to efficiently emitting white illumination that has been incident on the relief structure-forming layer 10. In FIG. 13, illustration of the light reflection layer 30 is omitted.

In FIG. 13, when an observer observes the relief structure-forming layer 10 from above in the z-axis direction, the observer will perceive the light reflected and emitted by the concavo-convex structure provided to the relief structure-forming areas 11 to 14 and by the light reflection layer 30 formed in conformity with the concavo-convex structure. The emission light that reaches the observer indicates a chromatic color with any hue created by a specific wavelength determined by the differences in height between the first and second surfaces 21 and 22.

The convexities 20 have a structure depth which is different between a set of the relief structure-forming areas 11 and 13 and a set of the relief structure-forming areas 12 and 14. Accordingly, different colors can be displayed between these sets of areas. The relief structure-forming areas 11 to 14 in optional shapes enable expression of an image, such as a design or a letter, or a numeral or a symbol. FIG. 13 illustrates each of the relief structure-forming areas 11 to 14 as a single area. However, each of the relief structure-forming areas 11 to 14 may be configured by a plurality of separate sub-areas. FIGS. 1 and 2 show a configuration in which the relief structure-forming areas 11 to 13 each are a single area, while the relief structure-forming area 14 is composed of two sub-areas (the inside and the outside of the letter "P").

In the configuration shown in FIG. 13, the relief structure-forming areas 11 to 14 have virtual planes 111 to 114, respectively, having respective different heights from the base surface 110. The display effects of the chromatic color achieved by the concavo-convex structure provided in the relief structure-forming areas are not influenced by the differences in height of the virtual planes 111 to 114. The displayed hue is univocally determined by the height of the concavo-convex structure, i.e. the differences in height between the first and second surfaces 21 and 22. Specifically, the relief structure-forming areas 11 and 13 shown in FIG. 13, although their respective virtual planes 111 and 113 are different in height, display the same color because the height of the concavo-convex structure is substantially uniform. The same applies to the relief structure-forming areas 12 and 14.

These visual effects are similar as well when the relief structure-forming areas 11 to 14 are observed from the base surface 110 side. When the relief structure-forming layer 10 is observed from below in the z-axis direction as well, the relief structure-forming areas 11 and 13 are perceived to be the same color, while the relief structure-forming areas 12 and 14 are also perceived to be the same color. The hue of the displayed chromatic color only relies on the height of the concavo-convex structure.

In addition to the relief structure-forming layer 10 and the light reflection layer 30, the display 1 is further laminated with a light scattering layer to provide the layer configuration shown in FIG. 3. When an observer observes the display 1 from the back side, the white illumination incident on the display 1 is transmitted through the light scattering layer, reflected by the light reflection layer 30 provided in conformity with the shape of the concavo-convex structure of the relief structure-forming layer 10, again transmitted through the light scattering layer, and reaches the observer's eye.

The light reflected by the light reflection layer 30 provided in conformity with the concavo-convex structure of the relief structure-forming layer 10 is the light of a chromatic color with an optional hue created by the specific wavelength that is determined by the differences in height of the concavo-convex structure. However, as a result of the transmission through the light scattering layer, the light of the specific wavelength and the specular reflection from the light reflection layer 30 (the light in white color conforming to the wavelength distribution of the white illumination) are mixed, and thus the light that reaches the observer's eye has a hue which is different from the light observed from the front side.

Figure 14:
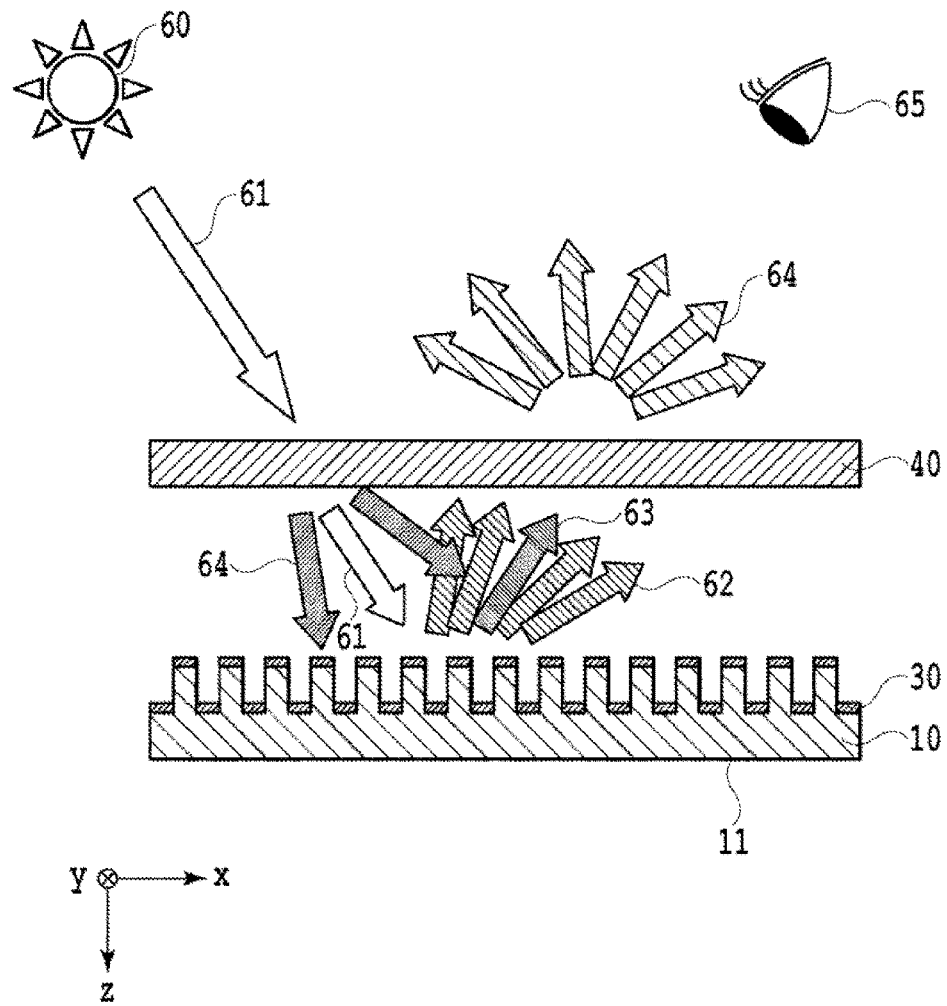
FIG. 14 is a schematic diagram illustrating a behavior of light which is incident on a display and which passes through layers.

FIG. 14 is a cross-sectional view illustrating a state where light 61 from a white illumination source 60 is incident on the light scattering layer 40 of the display 1, and the light emitted after being reflected by the light reflection layer 30 and again passing through the light scattering layer 40 reaches an observer 65. In order to illustrate the path of light, the light scattering layer 40, the relief structure-forming layer 10 and the light reflection layer 30 are separately shown but, as a matter of fact, these layers are configured to be in intimate contact with each other.

The white illumination 61 emitted from the light source 60 is transmitted through the light scattering layer 40, turning to white scattered light 64, and reaches the light reflection layer 30. Then, the light reflection layer 30 which is formed in conformity with the concavo-convex structure of the relief structure-forming layer 30 emits light 62 that displays a chromatic color with the specific wavelength, while concurrently emitting specular reflection 63. In this case, the light 62 of the specific wavelength and the specular reflection 63 are emitted in mutually different directions. The light 62 and the specular reflection 63, when again being transmitted through the light scattering layer 40, are scattered and mixed with each other for the emission of the scattered light 64 in white color from the scattering layer 40.

When the light scattering layer 40 has sufficient light scattering performance, the scattered light 64 is emitted as white light of a uniform light quantity across a wide observation range. On the other hand, when the light scattering performance of the light scattering layer 40 is low, the scattered light 64 becomes light of a display color with the chroma derived from the original light 62 of the specific wavelength. In other words, the control over the light scattering performance of the light scattering layer 40 enables control over the chroma of the display color when the display 1 is observed from the light scattering layer side.

As shown in FIG. 3, in the display 1, the thickness of the light scattering layer 40 changes in accord with the height of the virtual plane of the concavo-convex structure from the base surface 110. When the virtual plane is near the base surface 110 (when the height from the base surface 110 is small), the thickness of the light scattering layer 40 becomes relatively large. Contrarily, when the virtual plane is far from the base surface 110 (when the height from the base surface 110 is large), the thickness of the light scattering layer 40 becomes small. When the light scattering performance per unit volume of the light scattering layer is taken as being uniform, the light scattering performance is in proportion to the thickness of the light scattering layer 40.

In FIG. 3, the light scattering area 15 corresponding to the relief structure-forming area 11 has a small thickness and low light scattering performance. Also, the light scattering area 18 corresponding to the relief structure-forming area 14 has a large thickness and high light scattering performance.

Further, the convexities 20 formed in the relief structure-forming areas 11 and 13 have a height that is different from the height in the relief structure-forming areas 12 and 14. Therefore, when the display 1 is observed from the front side (relief structure-forming layer 10 side), the observer can perceive a display created by a total of two chromatic colors, one being the display color of the relief structure-forming areas 11 and 13, and the other being the display color of the relief structure-forming areas 12 and 14.

On the other hand, when the display 1 is observed from the back side (light scattering layer 40 side), the display color of the relief structure-forming areas 11 and 13 is influenced by the light scattering performance of the respective light scattering areas 15 and 17. Similarly, the display color of the relief structure-forming areas 12 and 14 receives the light scattering performance of the respective light scattering areas 16 and 18. The light scattering areas 15 to 18, whose thickness changes stepwise, have different light scattering performances. Accordingly, when observed from the back side (light scattering layer 40 side), four colors (4-step gradation), instead of two colors, can be displayed.

An image observed from the front side (relief structure-forming layer 10 side) and an image observed from the back side (light scattering layer 40 side) are displayed at completely the same position on the front and back. For example, when an analogous image is formed on one surface of the display 1 by means such as of a printing method, it is very difficult to achieve complete coincidence in the positions of the images on the front and back. On the other hand, the display 1 of the present embodiment enables display with complete coincidence in the positions on the front and back. The authenticity of the display 1 can also be determined by examining the offset in the positions of images on the front and back.

Figure 15:
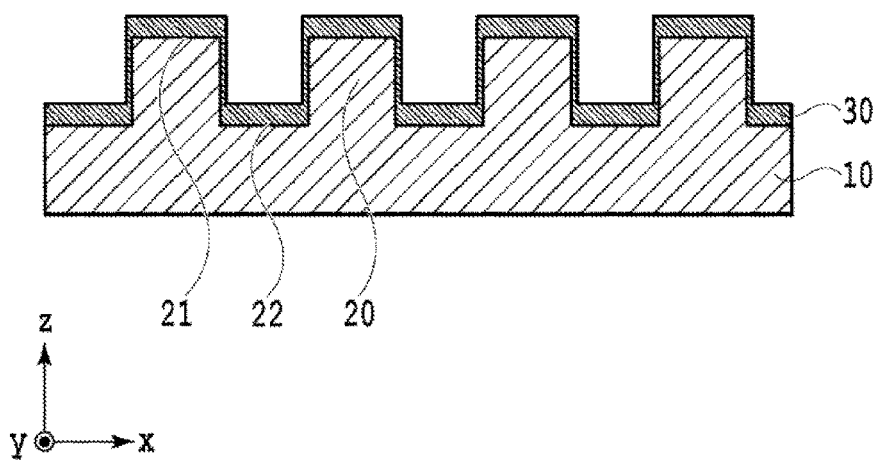
FIG. 15 is a cross-sectional view illustrating an example of a favorable light reflection layer.

The light reflection layer 30 that is at least partially formed in conformity with the shape of the concavo-convex structure of the relief structure-forming layer 10 contributes to more strongly reflecting the incident light. It is desirably so configured that, as shown in FIG. 15, the light reflection layer 30 is provided in conformity with the shapes of the plurality of convexities 20 formed on the relief structure-forming layer 10, with the smoothness of the first and second surfaces 21 and 22 being retained, and the surface of the light reflection layer 30 on the first surface 21 is parallel to the surface of the light reflection layer 30 on the second surface 22.

Figure 16:
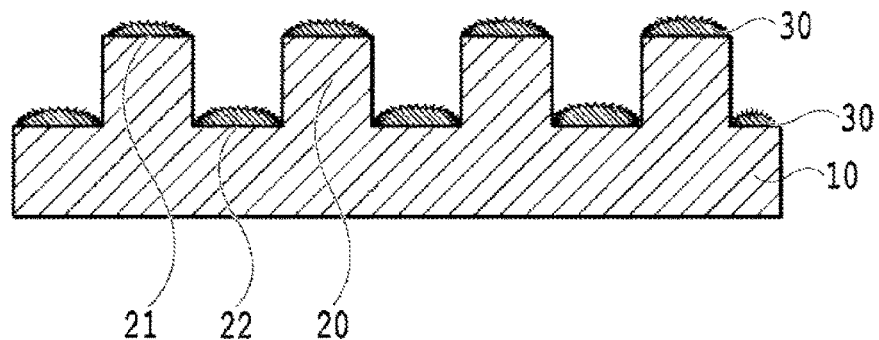
FIG. 16 is a cross-sectional view illustrating an example of an unfavorable light reflection layer.
Figure 17:
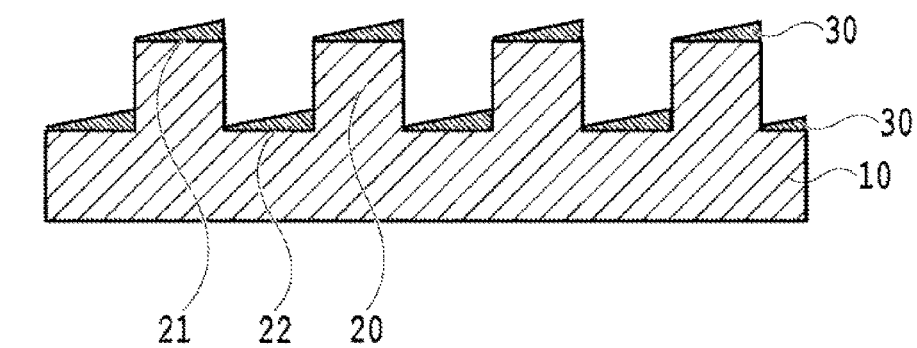
FIG. 17 is a cross-sectional view illustrating an example of an unfavorable light reflection layer.

FIG. 16 shows the case where the light reflection layer 30 has a rough surface and the smoothness of the light reflection layer 30 on the first and second surfaces 21 and 22 is not retained. FIG. 17 shows the case where the light reflection layer 30 is unevenly laminated on the first and second surfaces 21 and 22. In the cases shown in these figures, interference is caused and enlarges a light wavelength range where the diffraction efficiency is lowered. As a result, the chroma of an obtained display color is lowered and thus the display color exhibits a white color which is not substantially different from the wavelength distribution of the incident light.

Desirably, the light reflection layer 30 has a thickness of not less than 30 nm but not more than 70 nm, more preferably 50 nm. The light reflection layer 30 can be formed into a thin shape by a vapor phase deposition method. However, a thin film of metal, such as aluminum, gold or silver, will have a surface which tends to cause granular unevenness with a particle size of about 1 m. The granular unevenness is more easily enlarged as the formed layer has a larger thickness. On the other hand, when a formed layer is excessively thin, sufficient light reflection performance is no longer achieved. An ideal thickness of the light reflection layer 30 obtained through experiments was not less than 30 nm but not more than 150 nm. When the thickness of the light reflection layer 30 is set so as to fall within this range, it is possible to achieve both sufficient light reflection performance of the light reflection layer 30 and a smoothness in the surface of the light reflection layer 30 on the first and second surfaces 21 and 22.

The light scattering layer 40 contains, for example, a light transmissive synthetic resin and fine spherical microparticles having light scattering performance. The light scattering layer 40 that is permitted to contain spherical microparticles can sufficiently scatter the light of a specific wavelength and the specular reflection emitted from the relief structure-forming layer 10 to thereby obtain light scattering performance sufficient for emitting white light. By controlling the particle size and/or the quantity of the spherical microparticles to be filled in, the light scattering performance can be adjusted as desired. In order to sufficiently scatter the incident light, the spherical microparticles may have a particle size that is approximately the same as the incident wavelength. When the incident light is visible light having a wavelength of 460 to 640 nm, the spherical microparticles may have a size, for example, of about 500 nm.

At the same time with scattering incident light, the light scattering layer 40 has a function of transmitting the incident light therethrough. Therefore, the spherical microparticles may be scattered within the layer with an interval of some extent therebetween. The filling density of the spherical microparticles within the layer is typically 50%.

Besides the spherical microparticles, the light scattering layer 40 may further contain microparticles in other shapes, such as needle shapes or elliptic shapes, or microparticles having surfaces each of which is provided with fine projections or unevenness, or the like. Further, the light scattering layer 40 may further contain a light transmissive material. The light transmissive materials that can be used include an ink or a toner composed of a pigment or a dye, and a fibrous material, such as cellulose or starch.

In order to use the display 1 as a label, the light scattering layer 40 may be an adhesive layer. When the light scattering layer 40 is formed as an adhesive layer, the display 1 can be stuck onto an information display medium or other articles by means of the light scattering layer 40. When the display 1 is stuck onto a transparent printed object (e.g., plastic card) or a transparent article having light transmission performance, the display 1 can be observed from the back side via the transparent printed object and the article.

The light scattering layer 40 may have light scattering performance which is substantially uniform within a unit volume. When the light scattering layer 40 has light scattering performance which is substantially uniform within a unit volume, the light scattering performance of the light scattering layer 40 can be controlled by adjusting the thickness of the layer.

When the light scattering layer 40 is permitted to have light scattering performance which is substantially uniform within a unit volume, the light scattering layer 40 may have a haze value of not less than 80%. The haze value refers to a value that indicates a turbidity (haziness) when light is transmitted through a layer, such as a film, and is determined by the surface roughness of the layer and/or the scattering components inside the layer. A method of measuring the haze value is shown in optical characteristics testing methods for plastic (JIS K7136: 2000). The haze value is calculated from a ratio of diffused transmitted light to total transmitted light, which is defined by the following Formula (3).

[Math. 3]

$$\text{Haze[\%]} = \frac{T_d}{T_t} \times 100 \tag{3}$$

In the formula, Td represents a diffuse transmittance, and Tt represents a total light transmittance.

When the haze value of the light scattering layer 40 is permitted to be not less than 80%, the light of a specific wavelength and the specular reflection emitted from the relief structure-forming layer 10 can be well scattered and the emission light can be turned to white scattering light.

The total light transmittance $T_t$ of the light scattering layer 40 may be not less than 30%. The total light transmittance is a percentage of the quantity of light transmitted through the light scattering layer 40 to the quantity of light emitted from the relief structure-forming layer 10. When the total light transmittance $T_t$ of the light scattering layer 40 is permitted to be not less than 30%, a display color that is different from the front side can be achieved without unnecessarily blocking the light emitted from the relief structure-forming layer 10. It is better that the haze value and the total light transmittance $T_t$ of the light scattering layer 40 are both high. A haze value and a total light transmittance $T_t$ both approximate to 100% can achieve a monochrome display closer to a white color.

When light scattering elements are distributed within the layer in a non-uniform manner and when the light scattering elements each have a shape and/or a size that are altered in the layer, the light scattering performance of the light scattering layer 40 is no longer uniform in a unit volume. When the light scattering performance of the light scattering layer 40 is non-uniform in a unit volume, the density, distribution, shape and/or size of the light scattering elements may be adjusted to suppress the degree of scattering the light having an optional hue, which is emitted from the relief structure-forming layer 10. The light scattering performance of the light scattering layer 40 may be controlled by a plurality of means to produce a more complicated image as observed from the back side of the display 1.

In this way, the display 1 having the relief structure-forming layer 10, the light reflection layer 30 and the light scattering layer 40 according to the present embodiment is able to exert special visual effects which the conventional art could not achieve. More specifically, the display 1 of the present embodiment enables color display of multiple colors as observed from the front side and enables chromatic to achromatic (monochromatic) gradation display in accord with the thickness of the light scattering layer 40 as observed from the back side. Thus, the display 1 of the present embodiment can achieve high anti-counterfeiting effects.

Second Representative Embodiment

Figure 18A:
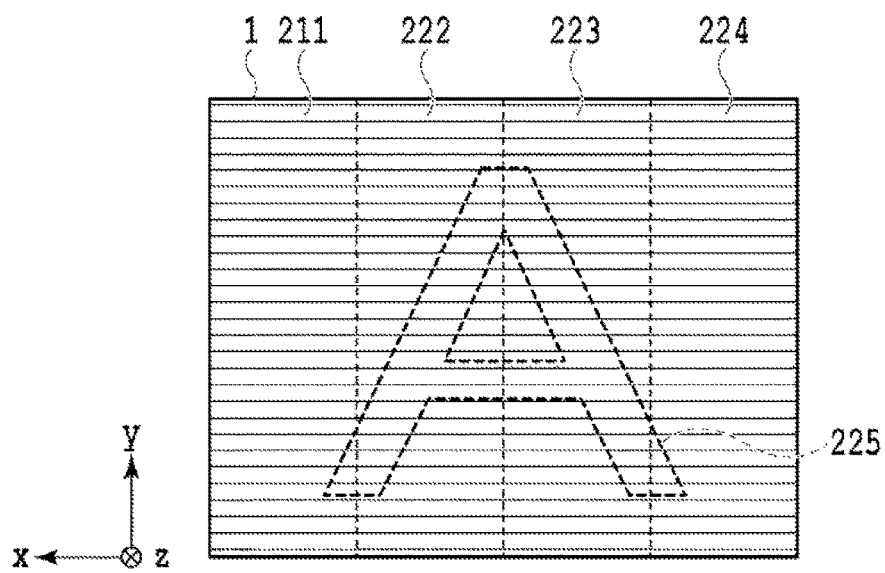
FIG. 18A is a plan view illustrating a pattern of relief structure-forming areas according to a second embodiment of the present invention.

The area-specific change in the light scattering performance of the light scattering layer 40 also enables display of visually recognizable information, such as a design, letter, numeral, and symbol. FIGS. 18A and 18B each show an example of a display 1 which displays information that is visually recognizable using differences in the light scattering performances of a light scattering layer 40.

FIG. 18A shows a pattern of relief structure-forming areas 211 to 215 configuring the display 1. As shown in FIG. 18B, the relief structure-forming areas 211 to 251 have the same height in concavo-convex structure, while having virtual planes 311 to 315 of different heights. A light scattering area 235 for displaying a letter "A" has the light scattering layer 40 of a large thickness, compared to light scattering areas 231 to 234 which display a background portion. Accordingly, the light scattering area 235 has high light scattering performance and thus is able to well scatter the light emitted from the relief structure-forming layer 10.

The light scattering areas 231 to 234 have low scattering performance, compared to the light scattering area 235. Since the light scattering performance of the light scattering areas 231 to 234 is permitted to change stepwise, the light scattering areas 231 to 234 correspond to scattering variable areas which are able to transmit the light emitted from the relief structure-forming layer 10 with any light quantity. The thickness of the light scattering layer 40 sequentially increases from the light scattering area 231 to the light scattering area 234 to thereby increase the light scattering performance. In other words, the heights of the virtual planes 311 to 314 configured by the top surfaces (first surface) of the convexities, relative to a base surface 130 are sequentially decreased from the light scattering area 231 to the light scattering area 234.

Figure 19:
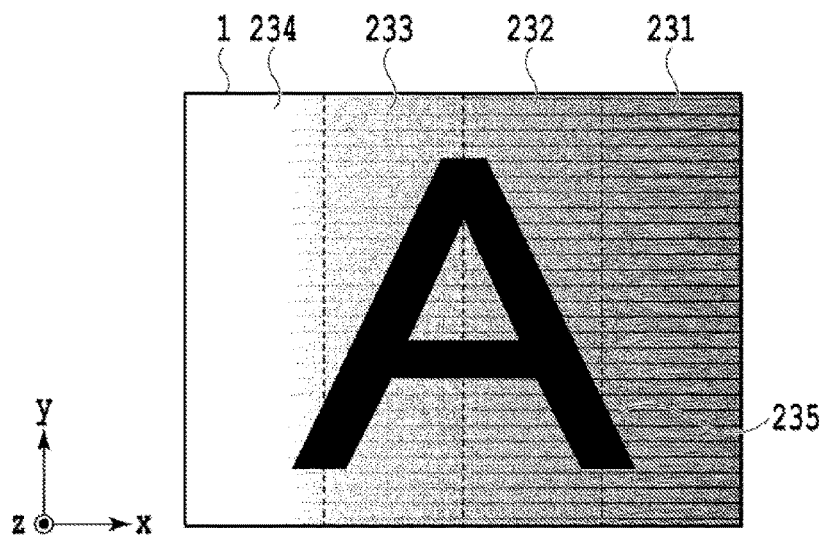
FIG. 19 is a plan view illustrating an appearance of a display according to the second embodiment, as observed from a back side.

When the display 1 of the present embodiment is observed from the back side, a display as shown in FIG. 19 is observed. The letter "A" shown in FIG. 19 is an image in white color displayed by the light scattering area 235. The background portion of the letter "A" provides a chromatic color display created by the relief structure-forming areas 211 to 214 that are laid under the light scattering layer 40 as viewed from the observer. The light scattering performance in the background portion changes stepwise, and thus the chromatic color display created by the relief structure-forming areas 211 to 214 is not sufficiently scattered enough to provide a multistep hue in pastel. The light scattering area 234 on the left of the display 1 exhibits high light scattering performance and thus no chromatic color display created by the relief structure-forming area 214 can be seen, but a display approximate to white color can be observed. However, the light scattering performance of the light scattering areas 233 to 231 lowers stepwise toward the right of the display 1, and thus the chromatic color display created by the relief structure-forming areas 213 to 211 can be observed stepwise. In the example shown in FIGS. 18A, 18B and 19, the background portion is configured by four types of relief structure-forming areas and light scattering areas. However, use of more number of types of relief structure-forming areas and light scattering areas can provide a smoother gradation display.

On the other hand, when the display 1 of the present embodiment is observed from the relief structure-forming layer 10 side, the display 1 provides only a display with a uniform chromatic color, as shown in FIG. 18A, created by the relief structure-forming areas 211 to 215, and neither the letter "A" nor the gradation display around the letter can be observed. This is because the concavo-convex structures of the relief structure-forming areas 211 to 215 have the same height.

In this way, the display 1 of the present embodiment can display completely different images on the front and back, instead of the images of a mirror-image relationship with different display colors as obtained in the first embodiment. This effect is ascribed to varying the light scattering performance of the light scattering layer 40 in accord with the thickness thereof, and forming visually recognizable information by the variation of the thickness. Accordingly, the display 1 of the present embodiment can exert special visual effects and high anti-counterfeiting effects, which have not been achieved based on the conventional art.

Third Representative Embodiment

Figure 20:
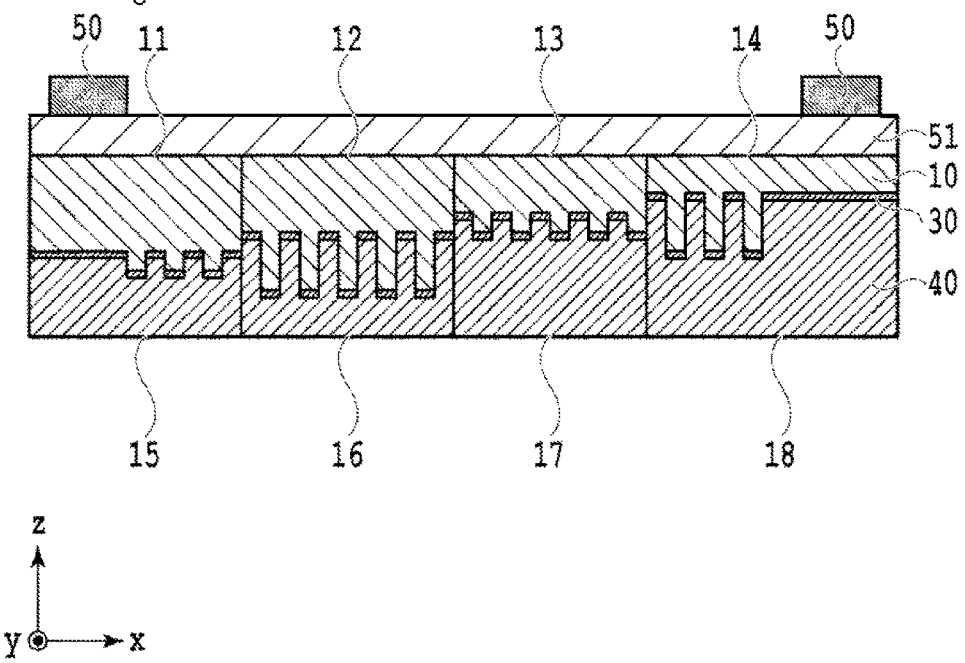
FIG. 20 is a cross-sectional view illustrating an example of a schematic configuration according to a third embodiment of the present invention.

FIG. 20 is a cross-sectional view illustrating a configuration of a display 1 related to a third embodiment of the present invention.

The display 1 of the present embodiment is different from the display 1 of the first embodiment in that a printed layer 50 and a surface protective layer 51 are further provided. The printed layer 50 and the surface protective layer 51, which realize other functions, can be appropriately added to any interface of the layers.

The printed layer 50 can be provided on a surface of the relief structure-forming layer 10 or the light scattering layer 40 of the display 1. The aesthetic quality of the display 1 can be improved by providing the printed layer 50. Also, information to be displayed on the display 1 can be easily added by providing the printed layer 50. It is preferable that the printed layer 50 is partially provided so as not to entirely cover the display on the display 1. The printed layer 50 may be formed using an invisible ink that allows concealed information to be reproduced by ultraviolet or infrared light emission, or a functional ink, such as a light absorbing ink. Alternatively, the printed layer 50 may be provided on some other functional layer, such as the surface protective layer 51 described below, or may be provided between the relief structure-forming layer 10 or the light scattering layer 40 and some other functional layer.

The surface protective layer 51 may, for example, be a hard coat layer that prevents breakage of the relief structure-forming layer 10, or an antifouling layer that prevents attachment of dirt or fingerprints. Provision of such a layer can prevent the surface of the display 1 from being broken or becoming dirty and thus can prevent damage to the image and information displayed by the display. For example, the surface protective layer 51 is provided to an outermost surface of a laminated structure of the display 1. The surface protective layer 51 may preferably be formed of a transparent or semi-transparent, desirably, colorless and transparent material so as not to impair visibility of the display 1.

Figure 21:
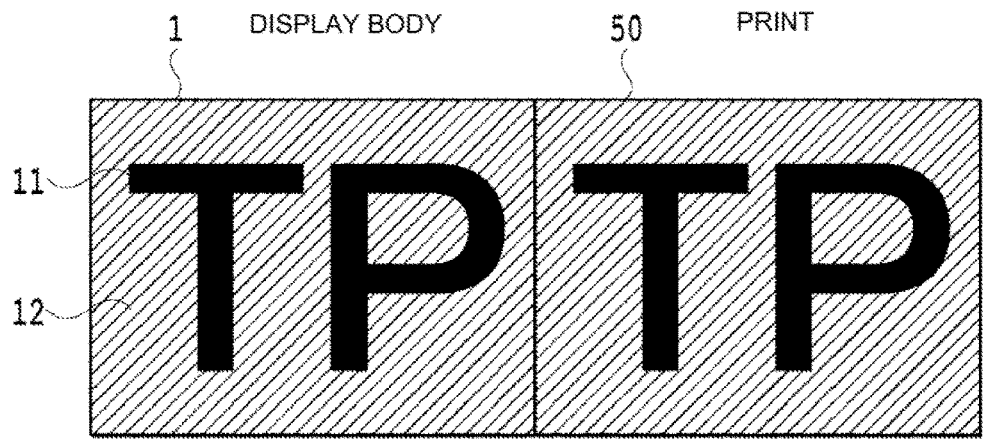
FIG. 21 is a plan view illustrating a difference in display between a relief structure-forming layer and a printed layer, as viewed from a relief structure-forming layer side.
Figure 21:
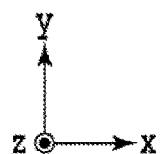
Figure 22:
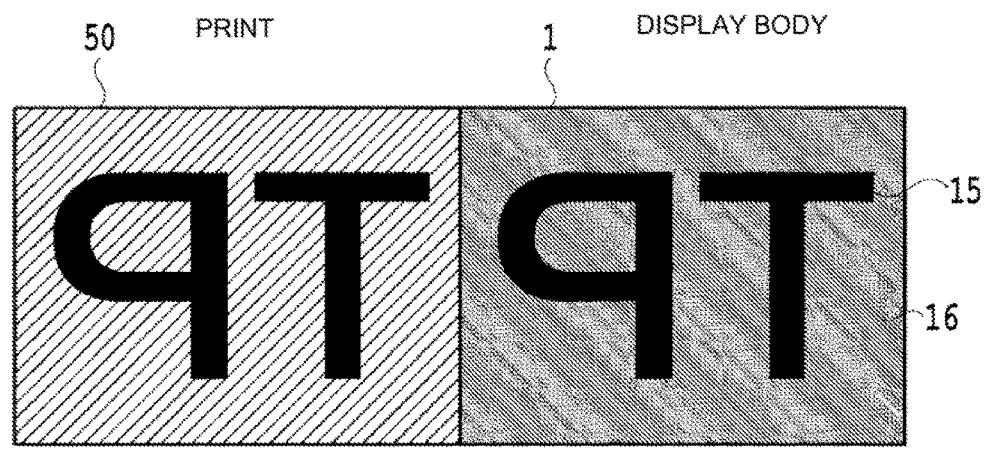
FIG. 22 is a plan view illustrating a difference in display between a relief structure-forming layer and a printed layer, as viewed from a light scattering layer side.
Figure 22:
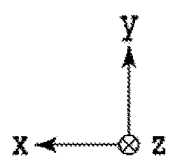

Referring to FIGS. 21 and 22, differences in display pattern are discussed below to thereby discuss the effects of the present embodiment.

FIG. 21 is a plan view illustrating the front side of the display 1. On the left of the display 1, a pattern is formed by the relief structure-forming layer 10 (relief structure-forming areas 11 and 12), while on the right of the display 1, a pattern is formed by the printed layer 50 in color. When the display 1 is observed from the front side (the relief structure-forming layer 10 and the printed layer 50 side), a pattern of "TP" in color display can be observed on both of the left and right sides of the display 1.

On the other hand, the light from the relief structure-forming layer 10 passes through the light scattering layer 40 and thus when observed from the back side, a hue which is different, as shown in FIG. 22, from the one observed from the front side, specifically, an achromatic color display of lower chroma is obtained. On the other hand, the light from the printed layer 50 is attenuated to some degree in chroma when passing through the light scattering layer 40, but the color display is retained. Accordingly, when observed from the front side, the "TP" pattern in color is obtained on both of the relief structure-forming layer 10 and the printed layer 50. From the back side, a monochrome display of the "TP" pattern created by the relief structure-forming layer 10 and the "TP" pattern in color display created by the printed layer 50 are obtained. It should be noted that the surface protective layer 51 is colorless and transparent and thus does not influence the visual effects of the display 1.

When the configuration shown in FIG. 20 is used, it is desirable that the light reflection layer 30 be "semi-transmissive" in order to enable observation of the printed layer 50 through the light reflection layer 30. The "semi-transmissive" light reflection layer 30 of the present invention has a visible light transmittance of not less than 25%, preferably 50% to 75%. To make the light reflection layer 30 "semi-transmissive", the light reflection layer 30 may desirably satisfy a condition, for example, of having a thickness of not more than 30 μm. Alternatively, the light reflection layer 30 does not have to be necessarily formed in the area where the printed layer 50 is formed.

According to the present embodiment, the pattern displayed by the relief structure-forming layer 10 is monochromatically displayed by being passed through the light scattering layer 40. On the other hand, the pattern displayed by the printed layer 50 is displayed with the same color in spite of its being passed through the light scattering layer 40. Accordingly, when observed from the back side, in a part of the observation, display (color display) that is the same as the one observed from the front side is obtained, and in a part of the observation, display (color display and monochromatic display) that is different from the one observed from the front side is obtained. Thus, the display 1 of the present embodiment is able to achieve special visual effects and high anti-counterfeiting effects which cannot be achieved by the conventional art.

In the event that a counterfeit product of the present display of a two-layer configuration including the printed layer 50 and the light scattering layer 40 goes in circulation, the difference between a genuine product and the counterfeit product is quite obvious when the display is observed from the back side (light scattering layer 40 side).

Fourth Representative Embodiment (How to Use the Display)

The display can be provided to a base, such as a paper sheet and a plastic film, or some other article, for observation from both of the front and back surfaces. In such a case, it may desirably so configured that the base or some other article is provided with an opening or provided with a window which enables visual contact from the front and the back, so that the display can be observed.

The display 1 described above may be used as a anti-counterfeiting label by permitting the light scattering layer 40 to serve as an adhesive layer. Alternatively, the display 1 may be stuck onto a printed object or some other article by means of a separately provided fixing means. The display 1 can display a unique color by strictly controlling the smoothness of the first and second surfaces of convexities or concavities configuring the fine concavo-convex structure, and the differences in height between the surfaces. Further, when the display 1 is observed from the back side via a light transmissive base or some other article, display with a different hue can be confirmed. Since it is difficult to highly accurately reproduce these visual effects, it is very difficult to counterfeit the display 1. When this label is carried by an article, the article with the label, i.e. a genuine product, it is also difficult to counterfeit or imitate it.

Figure 23:
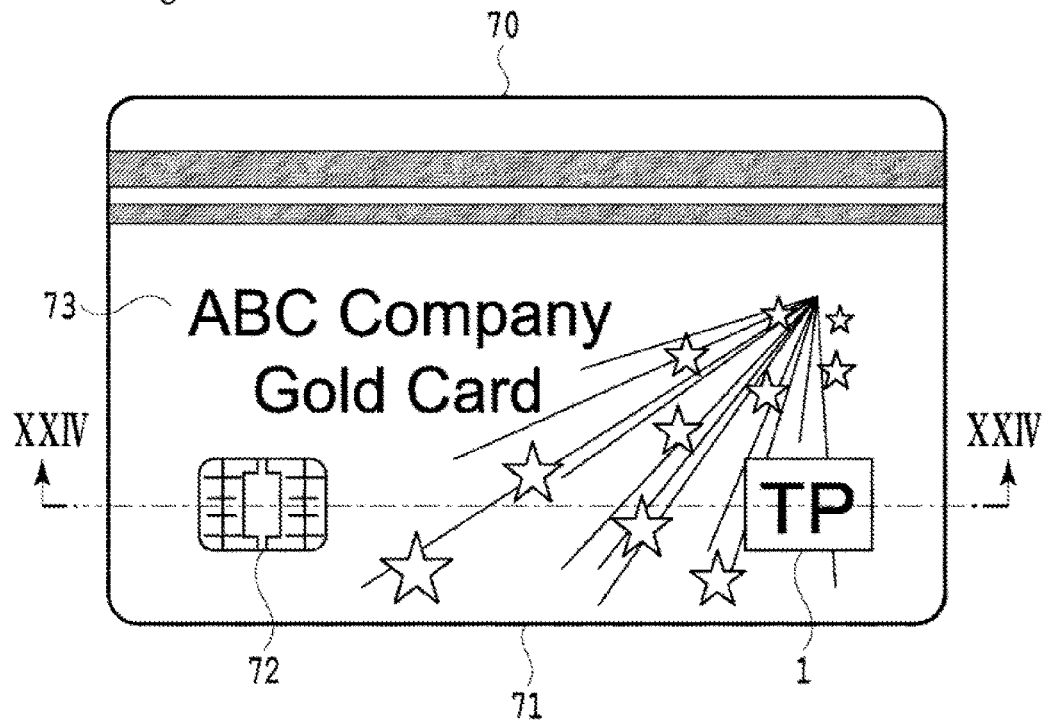
FIG. 23 is a plan view schematically illustrating an example of an article with a label related to a fourth embodiment of the present invention.
Figure 24:
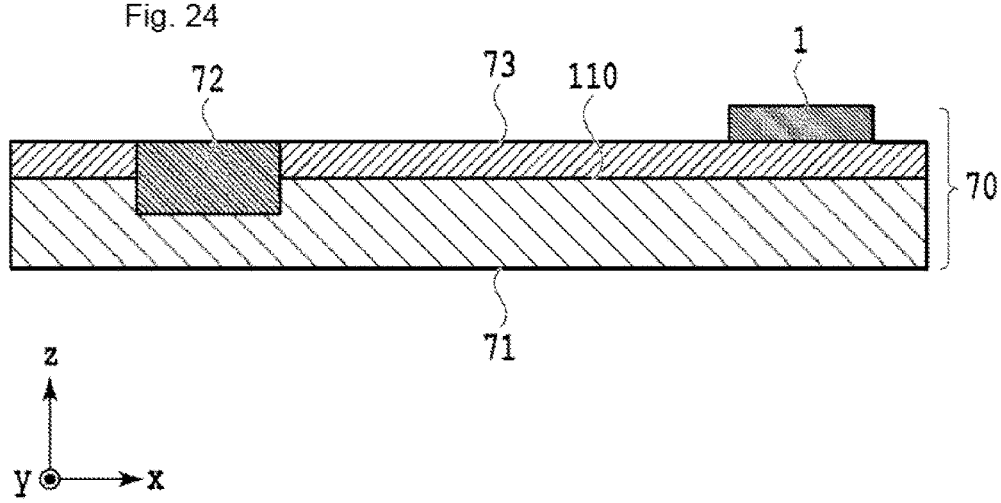
FIG. 24 is a cross-sectional view taken along the line XXIV-XXIV of the article with a label illustrated in FIG. 23.

FIG. 23 is a plan view schematically illustrating an example of an article with a label in which the display 1 is carried by the article. FIG. 24 is a cross-sectional view taken along a line XXIV-XXIV of the article with a label illustrated in FIG. 23.

FIGS. 23 and 24 show an IC (integrated circuit) card 70 as an example of the article with a label. The IC card 70 includes a light transmissive base 71. The base 71 is made, for example, of plastic. The base 71 has one base surface 74 which is provided with a recess into which an IC chip 72 is fitted. The IC chip 72 has a surface which is provided with electrodes. Information can be written into the IC and information can be read from the IC via these electrodes. A printed layer 73 is formed on the base 71. The display 1 of any of the first to third embodiments is stuck onto the surface of the base 71, on which the printed layer 73 is formed. The display 1 may be in the form of a label in which, for example, the light scattering layer 40 is an adhesive layer. In this case, the light scattering layer 40 can be stuck onto the printed layer 73 to fix the display 1 to the base 71. Alternatively, the display 1 may be used as a transfer foil and stuck onto the printed layer 73 by means of a separately provided adhering means, thereby fixing the display 1 to the base 71.

The IC card 70 includes the display 1. Therefore, it is difficult to counterfeit or imitate the IC card 70. Further, in addition to the anti-counterfeiting effects of the display 1, the IC card 70 can adopt an anti-counterfeiting measure making use of the IC chip 72 and the printed layer 73. Thus, according to the present embodiment, attachment of the display 1 described in any of the first to third embodiments to the IC card 70 can achieve anti-counterfeiting effects in a manner of electronic data, as well as anti-counterfeiting effects in a visual manner.

Although FIGS. 23 and 24 show an example of an IC card as a printed object including the display 1, a printed object including the display is not limited to this. For example, a printed object including the display may be: other cards, such as a wireless card and an ID (identification) card; valuable stock certificates, such as paper currency and gift tickets; a tag which is attached to an article that should be confirmed as being a genuine product; or a package or a part thereof which accommodates an article that should be confirmed as being a genuine product.

Further, an article with a label does not necessarily have to be a printed object. In other words, the display may be carried by an article that does not include the printed layer 73. For example, the display 1 may be carried by luxury articles, such as works of art. The display 1 may be used for purposes other than anti-counterfeiting. For example, the display 1 may be used as a toy, learning material or an ornament.

(Modifications)

It should be noted that the present invention should not be construed as being limited to the embodiments described above.

The number of the relief structure-forming areas provided to the relief structure-forming layer 10 is not limited to the number described in the above embodiments, but more number of types may be provided to the layer.

In the above embodiments, the relief structure-forming layer 10 is formed by processing an upper surface of a light transmissive base. As another method, the relief structure-forming layer 10 may be provided on a light transmissive base which is different from the relief structure-forming layer 10. Also, the material and the thickness of the light scattering layer 40 may be appropriately determined according to a needed transmission quantity and scattering quantity. Further, the materials of the spherical microparticles, the adhesive layer and the base can be appropriately changed according to specifications.

Various modifications of the present invention may be implemented within a scope not departing from the spirit of the present invention.

INDUSTRIAL APPLICABILITY

The present invention can be used as a display that exhibits anti-counterfeiting effects.

REFERENCE SIGNS LIST

1 Display
10 Relief structure-forming layer
11-14, 211-215 Relief structure-forming areas
15-18, 231-235 Light scattering areas
20 Convexity
21 First surface
22 Second surface
30 Light reflection layer
40 Light scattering layer
50 Printed layer
51 Surface protective layer
60 Light source
61 White illumination
62 Light of a specific wavelength
63 Specular reflection
64 Scattering light
65 Observer
70 IC card
71 Base
72 IC chip
73 Printed layer
74 Base surface
110 Base surface
111-114, 311-315 Virtual planes
d Pitch of a diffraction grating
DL Diffracted light
DL_r Diffracted light (red)
DL_g Diffracted light (green)
DL_b Diffracted light (blue)
GR Diffraction grating
IL Illumination
LS Light source
NL Normal line
RL 0-order diffracted light (specular reflection)
α Incident angle
β_r Incident angle of diffracted light with wavelength component R
β_g Incident angle of diffracted light with wavelength component G
β_b Incident angle of diffracted light with wavelength component B

What is claimed is:

1. A display comprising:
   a relief structure-forming layer having a plurality of relief structure-forming areas that are provided on one principal surface side of a light transmissive base;
   a light reflection layer covering at least a part of the relief structure-forming layer; and
   a light scattering layer provided by a side of the light reflection layer of the relief structure-forming layer, being imparted with light transmission performance, while being imparted with light scattering performance in at least a part thereof, wherein:
   the plurality of relief structure-forming areas have a plurality of convexities or a plurality of concavities having a first surface substantially parallel to the principal surface and a second surface substantially parallel to the first surface;
   the light reflection layer is formed in conformity with a shape of the plurality of convexities or concavities;
   in each of the plurality of relief structure-forming areas, a difference in height between the first surface and the second surface is substantially constant;
   in each of the plurality of relief structure-forming areas, at least one of a distance between the first surface and the second surface or a distance between the light transmissive base and a virtual plane extending along the first surface is different from a distance between a top surface and a bottom surface of other relief structure-forming areas or a distance between the light transmissive base and a virtual plane of the other relief structure-forming areas;
   the plurality of relief structure-forming areas are arranged in accordance with a color image to be displayed,
   the light scattering layer has a haze value of not less than 80% and a total light transmittance of not less than 30%,
   the plurality of convexities or concavities are arranged with regular intervals therebetween such that a width of an interval between adjacent convexities or concavities is 5 μm-10 μm,
   the plurality of convexities or concavities are arranged at equal distances from each other, such that each one of the convexities or concavities is spaced at an even interval from another one of the convexities or concavities, for all of the plurality of convexities or concavities, and
   the plurality of convexities each have an upper surface having a circular perimeter and a cylindrical side surface projecting above a base of the relief structure-forming layer.

2. The display according to claim 1, wherein each of the plurality of relief structure-forming areas, a distance between the light transmissive base and a virtual plane configured by the first surface is different from a height of the virtual plane in other relief structure-forming areas.

3. The display according to claim 2, wherein the light scattering layer includes a plurality of light scattering areas having different thicknesses and corresponding to the relief structure-forming areas.

4. The display according claim 1, further comprising that the display comprises a printed layer in color.

5. The display according to claim 1, wherein the light scattering layer contains spherical microparticles having light scattering performance.

6. The display according to claim 1, wherein the light scattering layer is an adhesive layer.

7. The display according to claim 1, characterized in that the light scattering layer has light scattering performance which is substantially uniform in a unit volume.

8. An article comprising a label thereon, wherein the label comprises a display according to claim 1.

* * * * *